United States Patent
Knee et al.

(10) Patent No.: US 7,488,926 B2
(45) Date of Patent: Feb. 10, 2009

(54) PIXEL ARRAY WITH SHARED PIXEL OUTPUT LINES

(75) Inventors: Derek L. Knee, Fort Collins, CO (US); Rajeev Badyal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/326,354

(22) Filed: Jan. 6, 2006

(65) Prior Publication Data

US 2007/0158531 A1 Jul. 12, 2007

(51) Int. Cl.
*H01L 27/00* (2006.01)

(52) U.S. Cl. .......... 250/208.1; 250/214.1; 348/303; 348/304

(58) Field of Classification Search .......... 250/208.1, 250/214 R; 348/302–310, 340; 345/163, 345/165, 166
See application file for complete search history.

(56) References Cited

U.S. PATENT DOCUMENTS

| | | | |
|---|---|---|---|
| 5,461,425 A | 10/1995 | Fowler et al. | |
| 5,801,657 A | 9/1998 | Fowler et al. | |
| 5,965,871 A | 10/1999 | Zhou et al. | |
| 6,028,299 A | 2/2000 | Hirama et al. | |
| 6,172,354 B1 | 1/2001 | Adan et al. | |
| 6,201,573 B1 | 3/2001 | Mizuno | |
| 6,271,785 B1 | 8/2001 | Martin et al. | |
| 6,303,924 B1 | 10/2001 | Adan et al. | |
| 6,330,030 B1 | 12/2001 | O'Connor | |
| 6,377,303 B2 | 4/2002 | O'Cnnor | |
| 6,512,858 B2 * | 1/2003 | Lyon et al. | 382/305 |
| 6,525,304 B1 | 2/2003 | Merrill et al. | |
| 6,541,751 B1 | 4/2003 | Bidermann | |
| 6,545,624 B2 | 4/2003 | Lee et al. | |
| 6,608,296 B1 * | 8/2003 | Toyoda et al. | 250/208.1 |
| 6,667,769 B2 | 12/2003 | Harton et al. | |
| 6,693,575 B1 | 2/2004 | Yang et al. | |
| 6,707,410 B1 | 3/2004 | Bock | |
| 6,741,198 B2 | 5/2004 | McIlrath | |
| 6,741,283 B1 | 5/2004 | Merrill et al. | |
| 6,756,576 B1 | 6/2004 | McElroy et al. | |
| 6,757,018 B1 | 6/2004 | Fowler | |

(Continued)

OTHER PUBLICATIONS

A Digital CMOS Imager with Pixel Level Analog-to-Digital Converter and Reconfigurable SRAM/Counter, <http://doi.ieeecomputersociety.org/10.1109/IWSOC.2004.1319845>; date of first publication unknown, but prior to Oct. 25, 2005.

(Continued)

*Primary Examiner*—Thanh X Luu
*Assistant Examiner*—Francis M Legasse, Jr.
(74) *Attorney, Agent, or Firm*—Birch, Stewart, Kolasch & Birch, LLP

(57) ABSTRACT

Multiple pixels within a pixel array share a common output line. Each output line from the array is connected to one or more storage elements. Each of the storage elements receives a counter signal corresponding to levels of a reference voltage within each of the pixels. When an output line signal reaches a predetermined value, a storage element receiving that predetermined value latches the current value of the counter signal. Outputs from pixels of multiple columns in the array may be time-multiplexed onto the output lines or may form a serial scan chain connected to a single output line.

17 Claims, 16 Drawing Sheets

U.S. PATENT DOCUMENTS

| | | | |
|---|---|---|---|
| 6,831,684 | B1 | 12/2004 | Ewedemi et al. |
| 6,891,143 | B2 | 5/2005 | Knee et al. |
| 6,906,304 | B2 * | 6/2005 | Knee et al. ............... 250/208.1 |
| 6,922,210 | B2 | 7/2005 | Yang et al. |
| 6,958,862 | B1 | 10/2005 | Joseph |
| 6,965,407 | B2 * | 11/2005 | Boemler et al. ............. 348/302 |
| 6,970,597 | B1 | 11/2005 | Olding et al. |
| 6,972,794 | B1 | 12/2005 | Wang et al. |
| 6,975,355 | B1 | 12/2005 | Yang et al. |
| 2003/0030738 | A1 | 2/2003 | Clynes et al. |
| 2003/0141434 | A1 * | 7/2003 | Ishikawa et al. ......... 250/208.1 |
| 2003/0193593 | A1 * | 10/2003 | Lee et al. .................... 348/302 |
| 2004/0047006 | A1 | 3/2004 | Kato |
| 2004/0051802 | A1 | 3/2004 | Krymski |
| 2004/0218088 | A1 | 11/2004 | Borg et al. |
| 2005/0001914 | A1 | 1/2005 | Kueny |
| 2005/0206752 | A1 | 9/2005 | Lim |
| 2005/0212926 | A1 | 9/2005 | Min et al. |
| 2005/0253812 | A1 | 11/2005 | Lin et al. |
| 2005/0259169 | A1 | 11/2005 | Ho et al. |

OTHER PUBLICATIONS

David Yang, et al., "A 640×512 CMOS Image Sensor with Ultrawide Dynamic Range Floating-Point Pixel-Level ADC; IEEE J. Solid State Circuits, vol. 34, No. 12, ,"<http://www-isl.stanford.edu/~abbas/group/papers_and_pub/jssc99_12.pdf>; Dec. 1999.

David Yang, et al., "A 640×512 CMOS Image Sensor with Ultra Wide Dynamic Range Floating-Point Pixel-Level ADC," Session No. 17, Nov. 1, 1998.

J.-L. Trépanier, et al., A Wide Dynamic Range CMOS Digital Pixel Sensor, <http://www.cours.polymtl.ca/ele6308/Exemple_Article_Chip.pdf>; date of first publication unknown, but prior to Oct. 25, 2005.

PB-MV13 20mm CMOS Active-Pixel Digital Image Sensor, <http://www.fast-vision.com/Downloads/bgawc4510/PB-MV13_Product_Specification.pdf>; date of first publication unknown, but prior to Dec. 30, 2005.

Evgeny Artyomov, et al., Adaptive Multiple Resolution CMOS Active Pixel Sensor, <http://www.ee.bgu.ac.II/~Orly_lab/Publications/2004-ISCAS_format_Adaptive_Multiple_Resolution_CMOS_Active_Pixel_Sensor.pdf.>; date of first publication unknown, but prior to Dec. 30, 2005.

Xavier Arreguit, et al., "A CMOS Motion Detector System for Pointing Devices," ISSCC96 Array Processors ad Image Based Sensors, Paper TP/64; date unknown, but believed prior to Nov. 27, 2001.

Xavier Arreguit, et al., "A CMOS Motion Detector System for Pointing Devices," IEEE J. of Solid-State Circuits, vol. 31, No. 12, pp. 1916-1921, Dec. 1996.

Rafael Dominguez-Castro, et al., "A 0.8 μm CMOS Two-Dimensional Programmable Mixed-Signal Focal-Plane Array Processor with On-Chip Binary Imaging and Instructions Storage," IEEE J. of Solid-State-Circuits, vol. 32, No. 7, pp. 1013-1026, Jul. 1997.

Stuart Kleinfelder, et al., "A 10,000 Frames/s CMOS Digital Pixel Sensor," IEEE J. of Solid-State Circuits, vol. 36, No. 12, pp. 2049-2059, Dec. 2001.

Nicolò Manaresi, et al., "A CMOS-Only Micro Touch Pointer," J. of Solid-State Circuits, vol. 34, No. 12, pp. 1860-1868, Dec. 1999.

O. Schrey, et al., "A Locally Adaptive CMOS Image Sensor with 90dB Dynamic Range," IEEE Int'l. Solid-State Circuits Conference, WA-17.6 (1999).

G. Torelli, et al., "Analog-to-Digital Conversion Architectures for Intelligent Optical Sensor Arrays," SPIE vol. 2950, pp. 254-264 (Aug. 1996).

David Yang, et al., "A Nyquist-Rate Pixel-Level ADC for CMOS Image Sensors," IEEE J. Solid-State Circuits, vol. 34, No. 3, Mar. 1999.

S. Kleinfelder, et al., "A 10,000 Frames/s 0.18μm CMOS Digital Pixel Sensor with pixel-Level Memory," <http://www-isl.stanford.edu/~abbas/group/papers_and_pub/isscc2001.pdf>; date of first publication unknown, but prior to Oct. 25, 2005.

\* cited by examiner

PIXEL ARRAY WITH SHARED PIXEL OUTPUT LINES

BACKGROUND OF THE INVENTION

Photo-sensitive electronic components can be used to create electronic imaging systems. These imaging systems can then be employed in a variety of applications. In some applications (e.g., digital photography), creating an image may be the ultimate goal. In other applications, data generated by the imaging system is analyzed for other purposes. As but one illustration, data collected by an imaging array can be used to detect and/or measure motion. Computer pointing or input devices (such as computer mice) are examples of devices that use imaging array data in such a manner.

When designing an imaging array, there is often a trade-off between the photosensing area in each element (or pixel) of the array and the speed with which the array can collect images (or "frames"). At a given illumination intensity, more time is needed to collect sufficient light if the photosensing area is reduced. Conversely, increasing the amount of photo-sensitive area within array pixels allows faster frame rates. In some applications (e.g., motion-sensing in a computer mouse), the frame rate is quite high (on the order of thousands of frames per second) and light levels may be very low. It is thus beneficial to maximize fill-factor when designing arrays for such applications. Fill-factor (i.e., the ratio within each pixel of light-sensing region to total pixel area) is reduced by elements such as power supply lines and lines carrying signals between the pixels and elements outside the array. The problem becomes more acute as the number of pixels increases. As more and more pixels are added to an array design, there are more and more power and signal lines that must cross over other pixels.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In at least some embodiments, multiple pixels within a pixel array share a common output line. Each output line from the array is connected to one or more storage elements. Each the storage elements also receives a counter signal corresponding to levels of a reference voltage within each of the pixels. When an output line signal reaches a predetermined value, the storage element receiving that predetermined value latches the current value of the counter signal. In at least some embodiments, outputs from pixels of multiple columns in the array are time-multiplexed onto common output lines. In at least some other embodiments, multiple pixels in an array form a serial scan chain connected to multiple storage elements.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
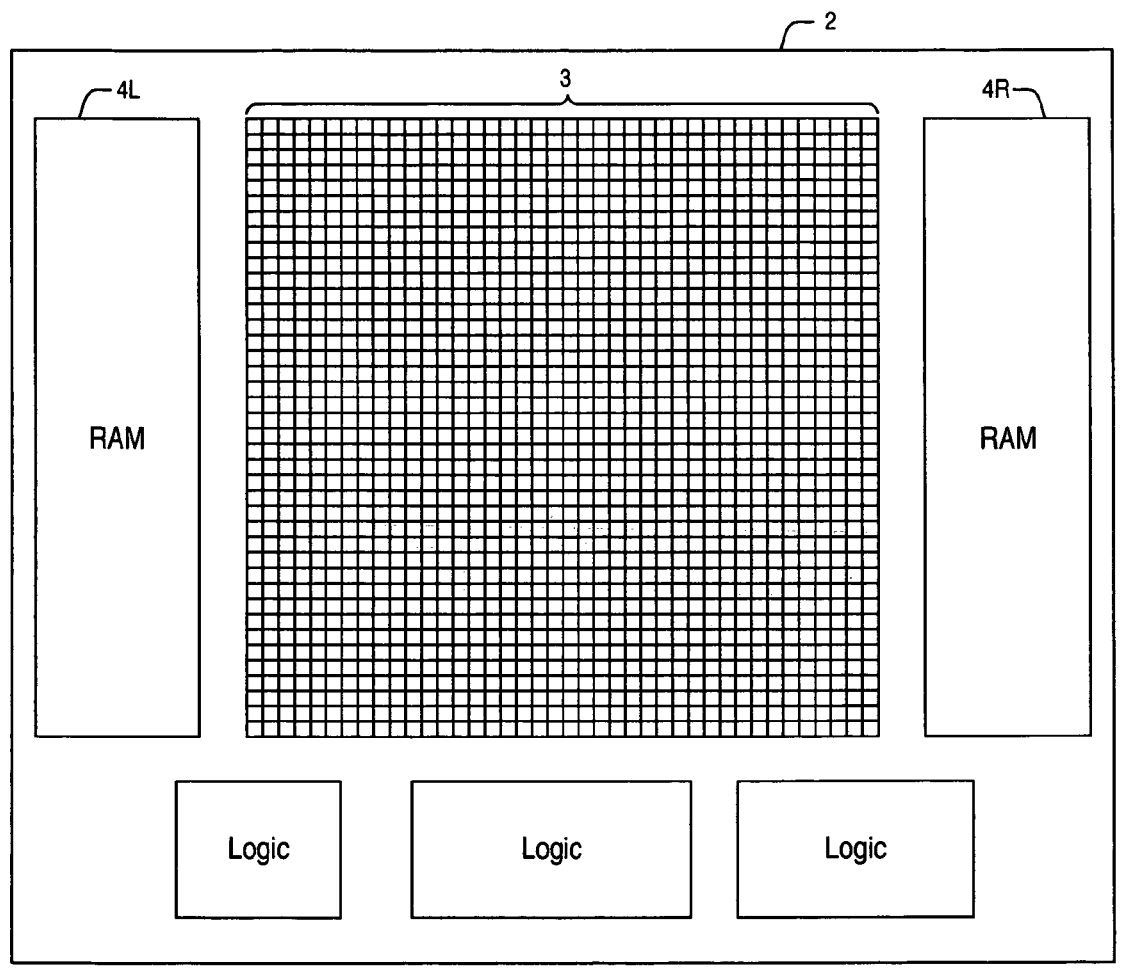
FIG. 1 is a block diagram of an Integrated Circuit (IC) containing an array of photosensing pixels and other elements according to at least one exemplary embodiment.

FIG. 1 is a block diagram of an integrated circuit (IC) 2 that includes an image sensor according to some embodiments of the invention. IC 2 includes a pixel array 3. The pixels of array 3 (shown as squares in FIG. 1) are arranged in a plurality of columns and rows Located on either side of array 3 are two blocks 4L and 4R of random access memory (RAM) storage elements. Block 4L includes a separate storage element for each pixel on the left half of array 3, and block 4R includes a separate storage element for each pixel on the right half of array 3. For simplicity, the individual storage elements of RAM blocks 4L and 4R are not depicted in FIG. 1. In at least some embodiments for an array having j rows and k columns (where j and k are integers and k is even), RAM blocks 4L and 4R each contains j rows and k/2 columns of individual storage elements. As explained in more detail below, the storage elements in RAM 4L and RAM 4R are used to hold data corresponding to columns of the pixels in array 3.

In operation, IC 2 is positioned so that array 3 receives light reflected from a surface or object so as to generate an image of the surface or object. As used herein, "light," "illumination," etc. includes light of visible and of non-visible wavelengths, and regardless of whether generated by a light emitting diode (LED), laser or other type of source. The operation of IC 2 is governed by one or more control logic components also located on IC 2. Those components (which are located in the regions labeled "logic" in FIG. 1) could include state machine circuitry, processor(s), or other suitable components capable of directing the operation of array 3 and other elements as described herein. Except as set forth below, the details of such controller device components are not necessary for an understanding of the invention. Hardware, software and/or firmware suitable for implementation of control logic for a photo-sensor array as described herein will be apparent to one of ordinary skill in the art from the information provided below. Additional circuitry may also be located in the logic regions of IC 2. Such circuitry (some of which is also discussed below) could include counters, address decoders, signal generators, biasing circuitry and digital to analog conversion (DAC) circuitry.

Figure 2:
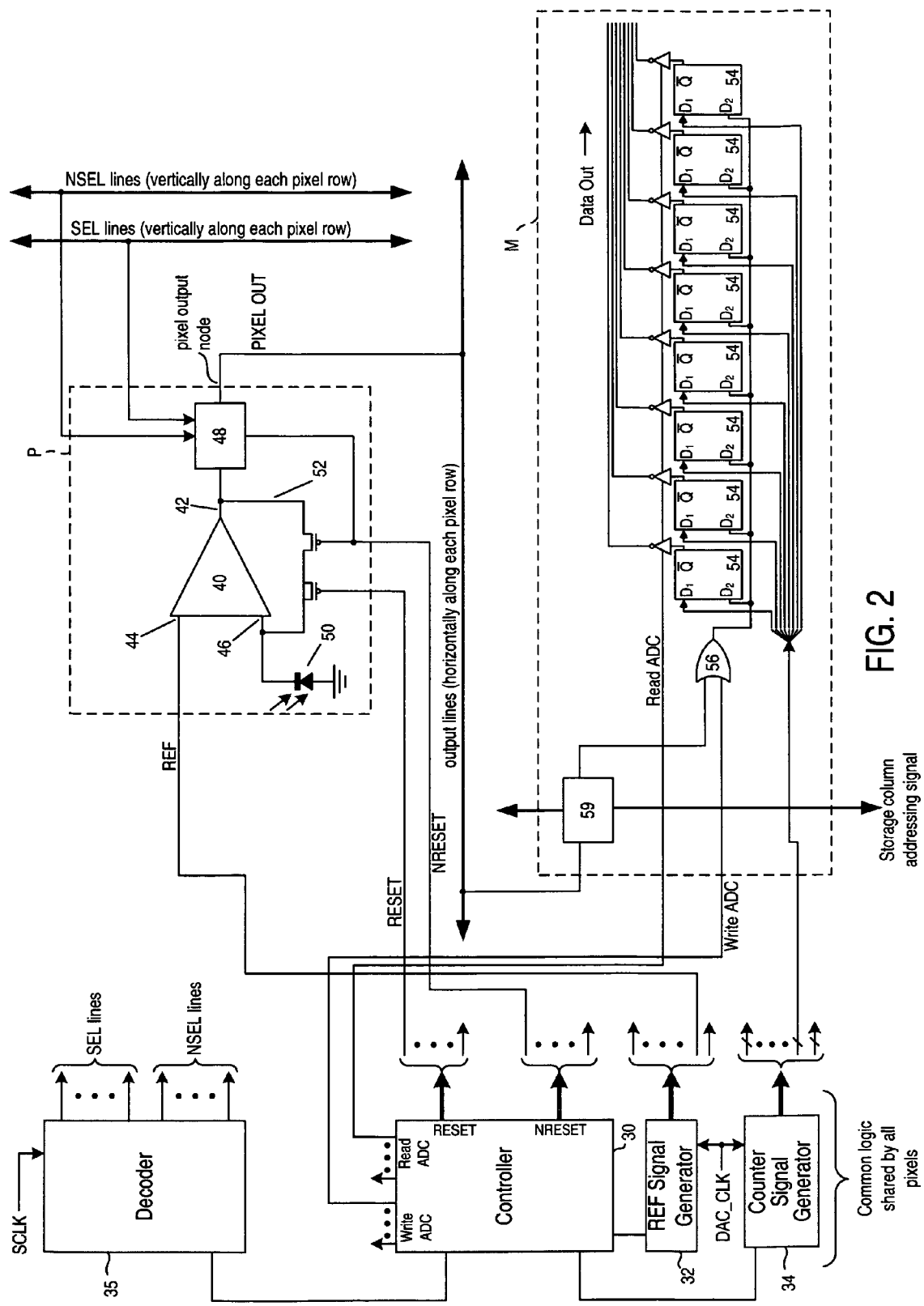
FIG. 2 is a block diagram showing a pixel and a corresponding storage element from the IC of FIG. 1.

FIG. 2 is a more detailed block diagram showing selected components of IC 2 according to at least some embodiments. Pixel P and storage element M are representative of other pixels and storage elements in IC 2. Also shown in FIG. 2 are blocks representing common logic components of IC 2 shared by all pixels. Controller 30 executes programming instructions so as to control the imaging and other functions of IC 2. Reference signal generator 32 includes circuitry that (under direction from controller 30) generates a signal (REF) having a high level and a low level, which signal can be varied from one level to the other over a designated period of time and held at a high or low level. In at least some embodiments, REF signal generator 32 is a digital to analog converter that (after reset) generates 256 sequentially decreasing voltages on edges of an 8-bit DAC_CLK signal. The details and implementation circuitry required for a signal generator such as REF signal generator 32 are known in the art, and thus not further described herein. In other embodiments, REF signal generator 32 may generate fewer discrete voltage levels (e.g., 64 levels), or may generate a true voltage ramp (e.g., a current source and capacitor generating a triangle wave).

Counter signal generator 34 includes circuitry that generates a multi-bit signal that can be used to measure elapsed time. In the embodiment of FIG. 2, counter signal generator 34 is reset at the same time as REF signal generator 32 and generates an 8-bit time-varying gray code that is synchronized with the 256 voltage levels output by REF signal generator 32. In other embodiments, the counter signal has a width of more or less than eight bits. Decoder 35, in response to an SCLK signal, outputs a high or low SEL signal over each of multiple SEL signal lines, as well as a low or a high NSEL signal over each of multiple NSEL signal lines. The purpose of the SEL and NSEL signals is described below. As with REF signal generator 32, the details and implementation circuitry required for counter signal generator 34 and decoder 35 are known in the art and thus not further described herein.

Pixel P and storage element M receive various signals from controller 30, REF signal generator 32, counter signal generator 34 and decoder 35. The counter signal, various signals provided by controller 30 (RESET, NRESET, Write ADC and Read ADC) and the SEL and NSEL signals are also provided to other pixels and storage elements in addition to pixel P and storage element M. In at least some embodiments, the same RESET, NRESET, REF and counter signals are provided to each pixel or storage element. As described in more detail below, the SEL and NSEL signals vary by column of array 3.

The output nodes of all pixels within a row (or portion of a row) of array 3 are connected to a single horizontal output line. Each pixel within a column of array 3 is connected to a common SEL signal line and receives a common SEL signal. Each pixel within a column of array 3 is similarly connected to a common NSEL signal line and receives a common NSEL signal. As to each column; the SEL signal is high when the NSEL signal is low, and vice versa. By sequentially sending a high signal along each of the SEL signal lines, the output signals (PIXEL OUT) from the pixels in each column of array 3 are time multiplexed into storage elements in one of RAM 4L or RAM 4R.

Pixel P includes a circuit 40 forming a differential pair gain stage. Circuit 40 has an output node 42 and two input nodes 44 and 46. Input node 46 is connected to ground through a photo-sensor 50. As the light sensing component in pixel P, it is desirable to maximize the exposed area of photo-sensor 50 relative to other elements within the pixel. Photo-sensor 50 may be a photodiode. In alternate embodiments, photo-sensor 50 could be a phototransistor or other illumination-sensitive component. The other input node 44 receives the REF signal from REF signal generator 32. Input node 46 and output node 42 are also connected by a feedback loop 52 having two switch transistors. One switch transistor receives the RESET signal; the other switch transistor and the circuit sub-block 48 receive the NRESET signal. In alternate embodiments, only the RESET signal is provided to each pixel, with additional circuitry in each pixel (e.g., inverters) generating the NRESET signal. Circuit 40 functions as a comparator when feedback loop 52 is open, and as a simple single-stage buffering operational amplifier (op amp) when feedback loop 52 is closed. Output node 42 is connected to circuit sub-block 48, additional details of which are provided below. Sub-block 48 receives the SEL and NSEL signals from the SEL and NSEL signal lines corresponding to the column of array 3 in which pixel P is located.

Storage element M includes multiple one-bit latches 54. Although eight latches 54 are shown, additional latches 54 are included in other embodiments so as to store higher resolution values of a counter signal having additional bits. In still other embodiments, a storage element includes fewer than eight latches. The $D_1$ input of each latch 54 is one of multiple parallel bit lines providing the counter signal. The $D_2$ input of each latch 54 receives the output of OR gate 56. When the signal received by the $D_2$ input is high, each latch 54 outputs at $\overline{Q}$ the value being received at $D_1$. When the $D_2$ input goes low, the output $\overline{Q}$ of each latch 54 remains at the value of $D_1$ at the point in time when $D_2$ went low, thereby latching the $D_1$ value when $D_2$ goes low. OR gate 56 receives an input from addressing circuitry sub-block 59, with sub-block 59 receiving the PIXEL OUT signal from pixel P along a row output line. When the appropriate signal is provided to sub-block 59 along the storage column addressing line, OR gate 56 is coupled to the output of pixel P. Thus, when the PIXEL OUT signal (transmitted from pixel P along a horizontal output line) goes low and storage element M is addressed (and assuming WRITE ADC is a logical 0), element M latches the value of the counter signal. In at least some embodiments, the SEL signal provided to a column of pixels is also used as the column addressing signal for a corresponding column of storage elements, as described in more detail below. Various types of circuit elements for implementing sub-block 59 are within the routine knowledge of persons skilled in the art (once such persons are provided with the information herein), and thus not further described.

As also seen in FIG. 2, parallel data lines emanate from the outputs $\overline{Q}$ of the latches 54. At an appropriate time, the Read ADC signal from controller 30 is used to read values from latches 54 into one or more other memory locations for subsequent signal processing or other purposes. The Write ADC signal may be used (in conjunction with appropriate counter signal values) to clear latches 54 or to write a specific value to those latches.

Figure 3:
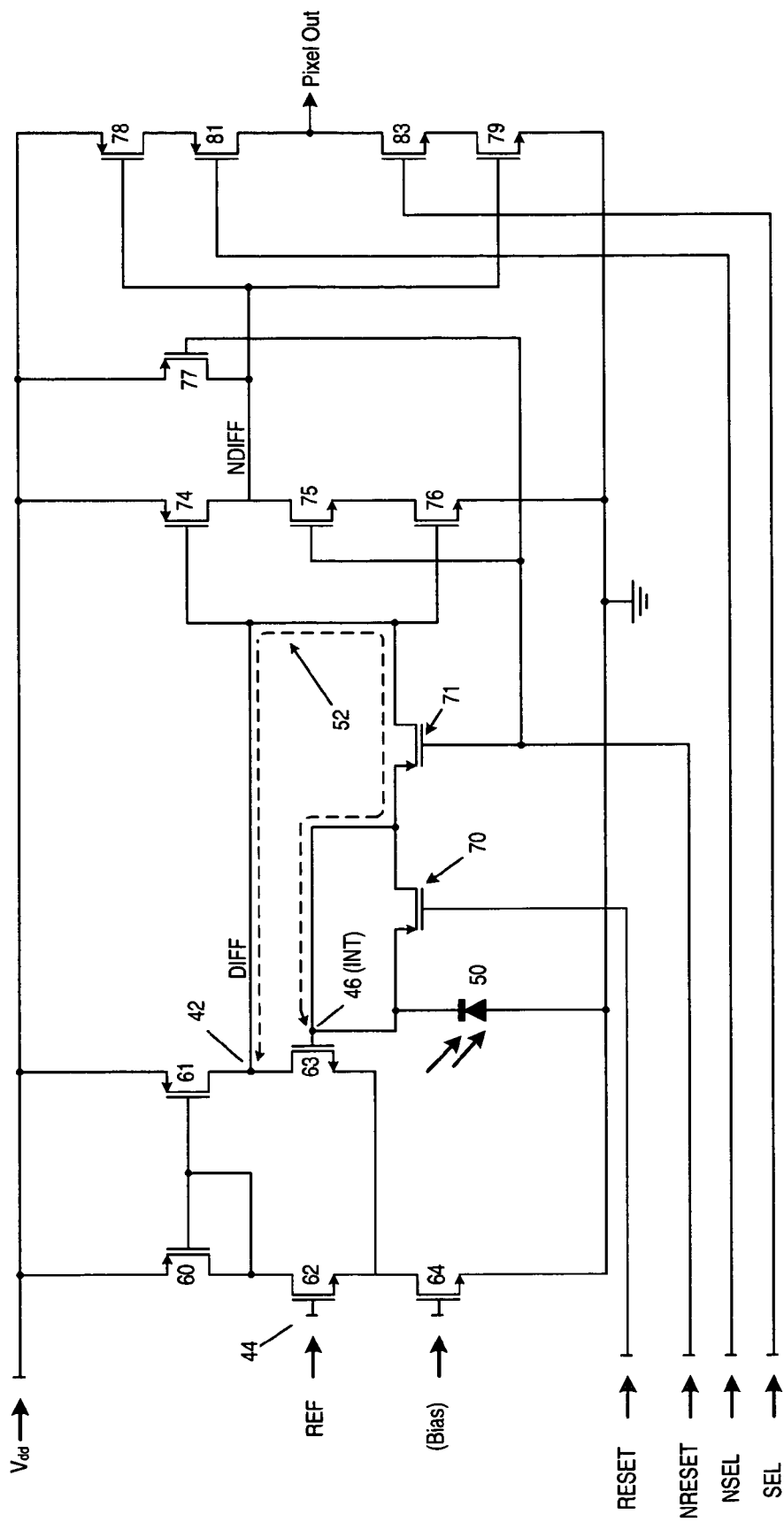
FIG. 3 is a schematic diagram of a pixel according to at least one exemplary embodiment.

FIG. 3 is a schematic diagram for pixel P, and is also representative of other pixels in array 3. Transistors 60, 61, 62, 63 and 64 form the circuit 40 shown in FIG. 3. PMOS devices 60 and 61 are connected to source voltage $V_{dd}$ and form a current mirror. One current path includes NMOS device 62, the gate of which forms input node 44 of circuit 40, and which receives the REF signal. The other current path includes NMOS device 63, the gate of which forms input node 46, the voltage at which is labeled INT. Photodiode 50 connects the gate of NMOS device 63 to ground; when exposed to illumination, a reverse bias current through photodiode 50 discharges the voltage at node 46.

Output node 42 is located between PMOS device 61 and NMOS device 63, and provides an output voltage DIFF. When the feedback loop 52 is open and the voltage of the REF signal is higher than the INT voltage, less current is able to flow through device 63. In this state, the DIFF voltage at the output node 42 is close to $V_{dd}$ (approximating a high logic level signal). When the voltage of the REF signal is lower than the INT voltage, more current is able to flow through device 63, and the DIFF voltage at the output node 42 is close to ground (approximating a low logic level signal). As also shown in FIG. 3, the output node 42 is connected to node 46 by feedback loop 52, the operation of which is described in more detail below. Included in feedback loop 52 are PMOS devices 70 and 71, the operation of which is also described below. The source and drain of device 70 are shorted.

Sub-block 48 (FIG. 2) is formed by PMOS devices 74, 77, 78 and 81 and by NMOS devices 75, 76, 79 and 83. The DIFF voltage from output node 42 biases the gates of PMOS device 74 and NMOS device 76. The voltage NDIFF of the first inverter stage (formed by devices 74, 75 and 76) biases the gates of PMOS device 78 and NMOS device 79, which form a second inverter stage. The high or low state of the second inverter stage output thus corresponds (when the NRESET signal is high and devices 81 and 83 are conducting, as described below) to the high or low state of the DIFF voltage. The operation of NMOS device 75 and PMOS device 77 (the gates of which are biased by the NRESET signal) is further described below.

PMOS devices 70 and 71 are used for charge-reduction in feedback loop 52. As is known, opening an FET switch induces a charge into a circuit because of gate to channel capacitance of the device and channel charge. Closing the switch also induces a charge, but of opposite polarity. The amount of this charge can be unpredictable. If only a single device were used to open and close feedback loop 52, this charge could increase or decrease the INT voltage of node 46 of each pixel, but in a non-uniform and unpredictable manner. This additional non-uniform and unpredictable variation on the INT voltage for each device would degrade image accuracy. Including two matched devices in feedback loop 52 permits reduction of some or all of this additional charge. In operation, devices 70 and 71 toggle simultaneously (i.e., one switches on while the other switches off). In other words, as device 71 toggles off (NRESET goes high) and impresses a charge of one polarity onto node 46, device 70 toggles on (RESET goes low) and impresses a similar charge of opposite polarity. In this manner, unpredictable charge injections are minimized and image accuracy enhanced. Typically, it is assumed that half of the channel charge in an FET device goes to the node connected to the FET source, and the other half goes to the node connected to the FET drain. In the case of circuit 40, however, node 42 is a low impedance, non-accumulating node. Accordingly, the charge injected into node 42 can be ignored. The charge injected by device 71 is therefore cancelled by making the physical size of device 70 approximately half (or slightly larger than half) the size of device 71 to account for the difference between nodes 42 and 46.

As indicated above, PMOS device 74 and NMOS devices 75 and 76 form a first (tri-state) inverter, with a second inverter formed by PMOS device 78 and NMOS device 79. PMOS 81 and NMOS 83 form a third (clocked) inverter. The DIFF voltage from output node 42 biases the gates of PMOS device 74 and NMOS device 76 in the first inverter stage, which provides an output NDIFF. The NDIFF voltage biases the gates of PMOS device 78 and NMOS device 79 in the second inverter stage. The high or low state of the second inverter stage output thus corresponds (when devices 81 and 83 are conducting) to the high or low state of the DIFF voltage. However, the high and low states of the DIFF voltage may not correspond to high and low voltage levels that are usable (or that are preferred for use) as digital logic levels. Accordingly, the inverters provide voltage gain. By using a tri-state inverter as the first inverter stage, power consumption is reduced when the feedback loop is closed (i.e., when the comparator becomes a unity gain op amp). When the feedback loop is closed, the voltage level at nodes 42 and 46 may be at a level that allows some current to flow through devices 74 and 76. By using a tri-state inverter as the first stage, however, current flow to ground (and thus, power loss) during feedback can be reduced. When the NRESET signal is low, no current flows through device 75. Device 77 is on when the NRESET signal is low.

Figure 4:
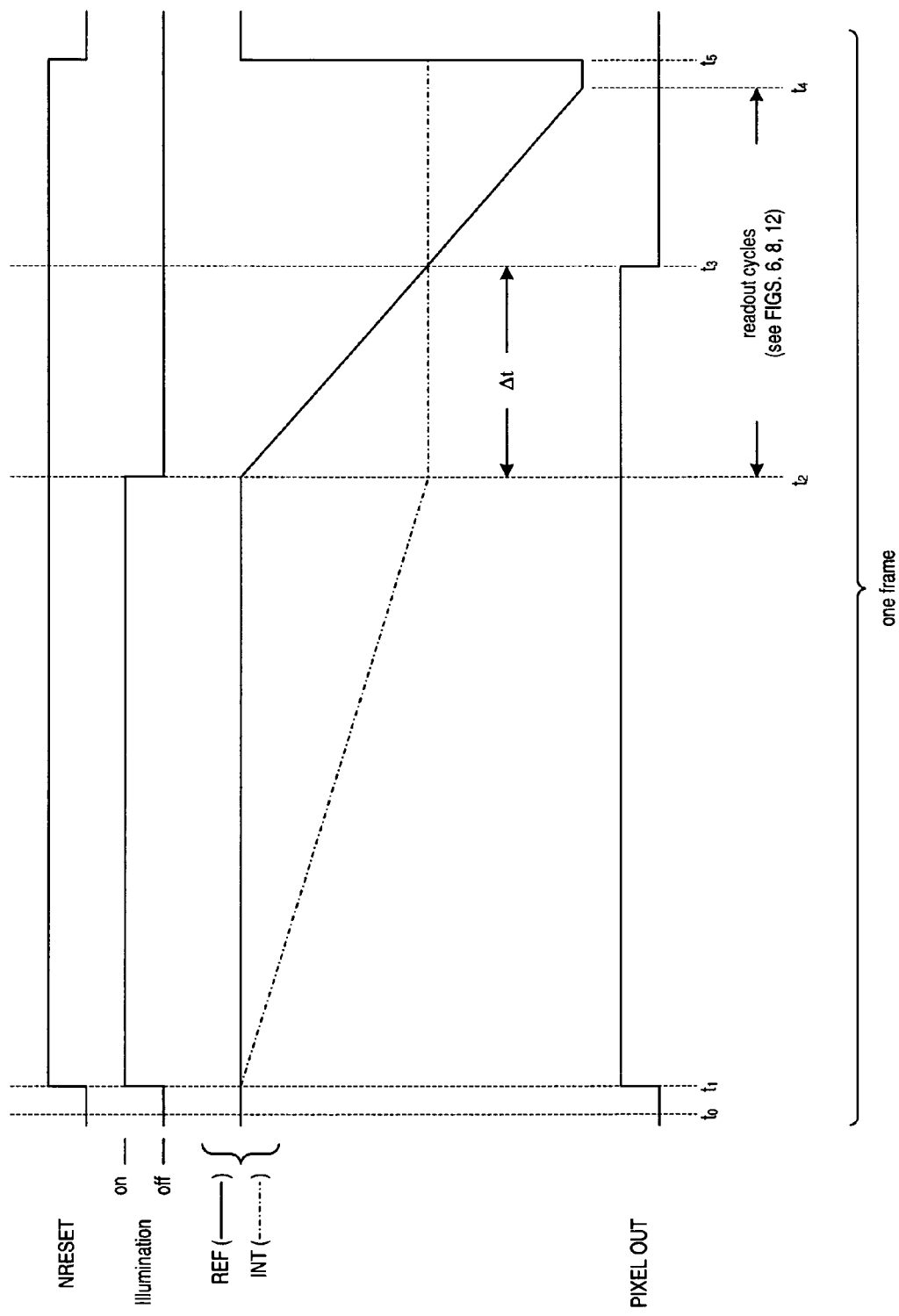
FIG. 4 is a timing diagram showing the relationship between a frame period and readout periods according to at least some exemplary embodiments.

FIG. 4 is a timing diagram explaining operation of example pixel P during one frame of an imaging cycle. Other pixels in array 3 operate in a similar manner. The NRESET line represents the state of the NRESET signal (i.e., low or high); the Illumination line represents the condition of an illumination source such as a Light Emitting Diode (LED) or laser; and the REF line indicates the voltage level of the REF signal. The line labeled INT represent the INT voltage state of the node 46. The PIXEL OUT line indicates the state the PIXEL OUT voltage signal if devices 81 and 83 are conducting. The SEL and NSEL signals are not shown in FIG. 4, but are discussed below.

At time $t_0$, the NRESET signal is low. The illumination source is not activated, as indicated by the low value of the Illumination line. Because NRESET is low, nodes 42 and 46 are connected. In this mode, feedback loop 52 is closed, and the INT voltage at node 46 is equal to the REF signal voltage, plus (or minus) any pixel-specific offset caused by any device mismatching within the pixel's comparator/op-amp circuit. When NRESET is low, PMOS 77 is conducting and NMOS 75 is non-conducting. Accordingly, the voltage NDIFF is high without regard to the output node voltage DIFF. The high NDIFF signal voltage makes NMOS transistor 79 conducting and PMOS transistor 78 non-conducting.

At time $t_1$, the NRESET signal goes high and the RESET signal (not shown in FIG. 4) goes low. Because RESET is low, PMOS transistor 70 becomes conducting, and PMOS transistor 71 is non-conducting, breaking the connection between node 46 and node 42. At the same time, the illumination source is turned on (illumination high in FIG. 4). Light falling on photodiode 50 allows a reverse bias current through photodiode 50, thus discharging node 46 toward ground. The magnitude of the reverse bias current (and thus the speed at which the INT voltage at a node 46 is discharged) varies with the intensity of illumination, and thus the rate at which the INT voltage drops will typically vary for different pixels in array 3.

The REF signal is held high while the illumination source is activated (the $t_1$-$t_2$ interval), and the DIFF voltage at output node 42 goes high when the INT voltage drops. Because NRESET is high, NMOS 75 is on and PMOS 77 is off. The illumination ($t_1$-$t_2$) interval is the same for all pixels in the array 3, and can be arbitrarily chosen. In some embodiments, the $t_1$-$t_2$ interval is of sufficient duration to allow all pixels' photodiodes to at least partially discharge over a desired range of illumination intensity, but not so long that pixels may discharge to below the lowest range of the REF signal before the illumination is discontinued. The interval can be the same from imaging cycle to imaging cycle, or can be varied.

Beginning at time $t_2$, the REF signal is decreased from its high value to its low value, as shown by the downwardly sloping REF signal voltage line from $t_2$ to $t_4$ in FIG. 4. As previously described, the REF signal includes a series of 256 sequentially decreasing voltages, thereby approximating a linearly decreasing voltage ramp. Because the illumination source is also turned off at time $t_2$, the current through photodiode 50 substantially stops, and the INT voltage generally holds at the level reached when the illumination source was deactivated. For simplicity, dark current leakage (the effects of which can be addressed in subsequent signal processing) is ignored in FIG. 4. When the falling REF signal voltage reaches the level of the INT voltage (plus or minus any offset voltage caused by device mismatching within the pixel), the DIFF voltage at node 42 goes low. In the example of FIG. 4, this occurs at time $t_3$.

Between times $t_2$ and $t_4$, the values of all pixels in array 3 are repeatedly read by sequentially sending a high SEL signal and a low NSEL signal along each column of array 3. Referring to FIG. 3, PMOS device 81 receives an NSEL signal and NMOS device 83 receives a SEL signal. The NSEL signal for a given column of array 3 is high when the SEL signal for that same column is low, and vice versa. Accordingly, when the SEL signal is high (and the NSEL signal is low), the PIXEL OUT signal is an amplified version of the DIFF signal. Conversely, a low SEL signal disconnects the pixel NDIFF signal from the PIXEL OUT signal and allows other pixels to use this shared PIXEL OUT signal.

Figure 5:
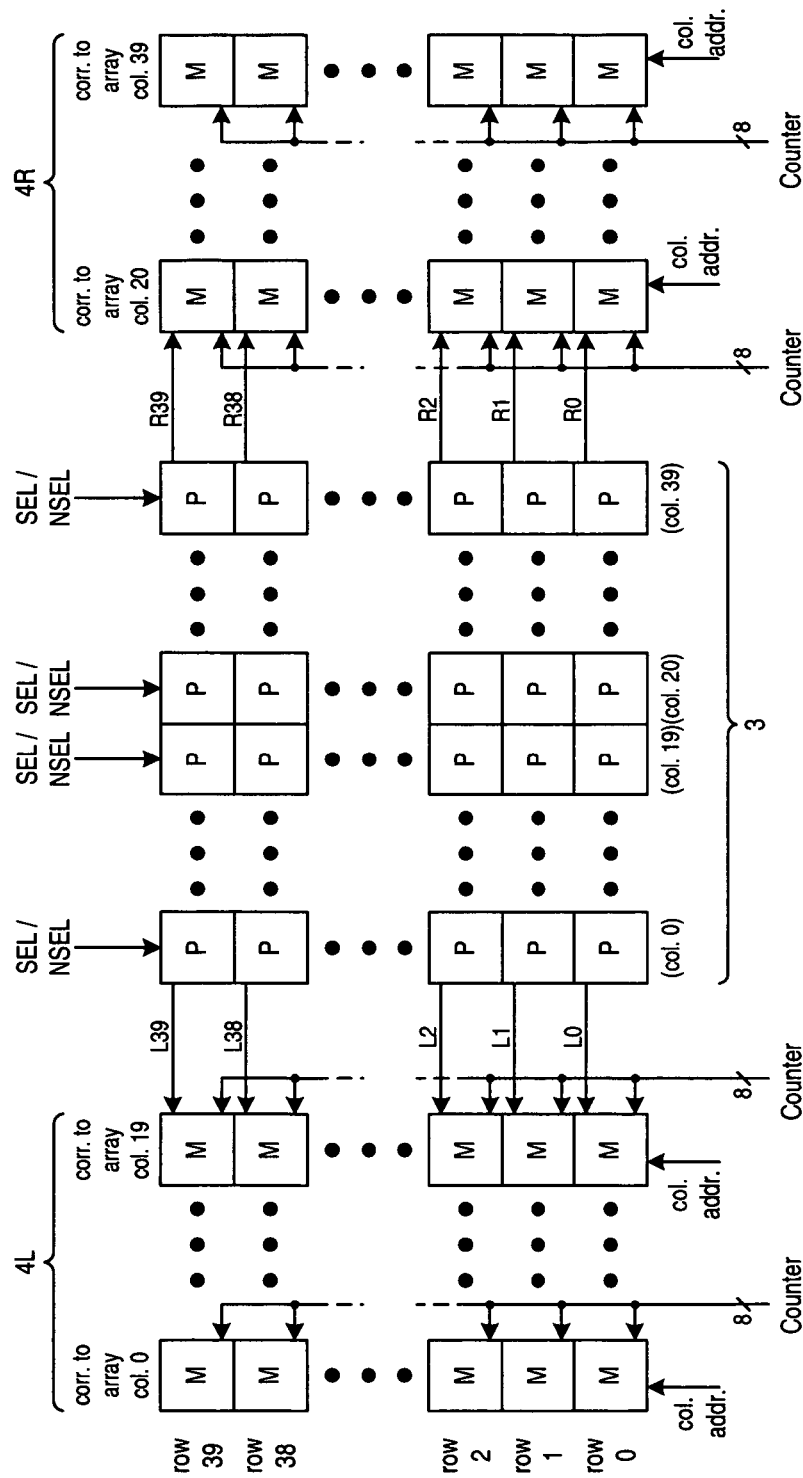
FIG. 5 is a block diagram illustrating readout from pixels to storage elements according to at least some exemplary embodiments.
Figure 6:
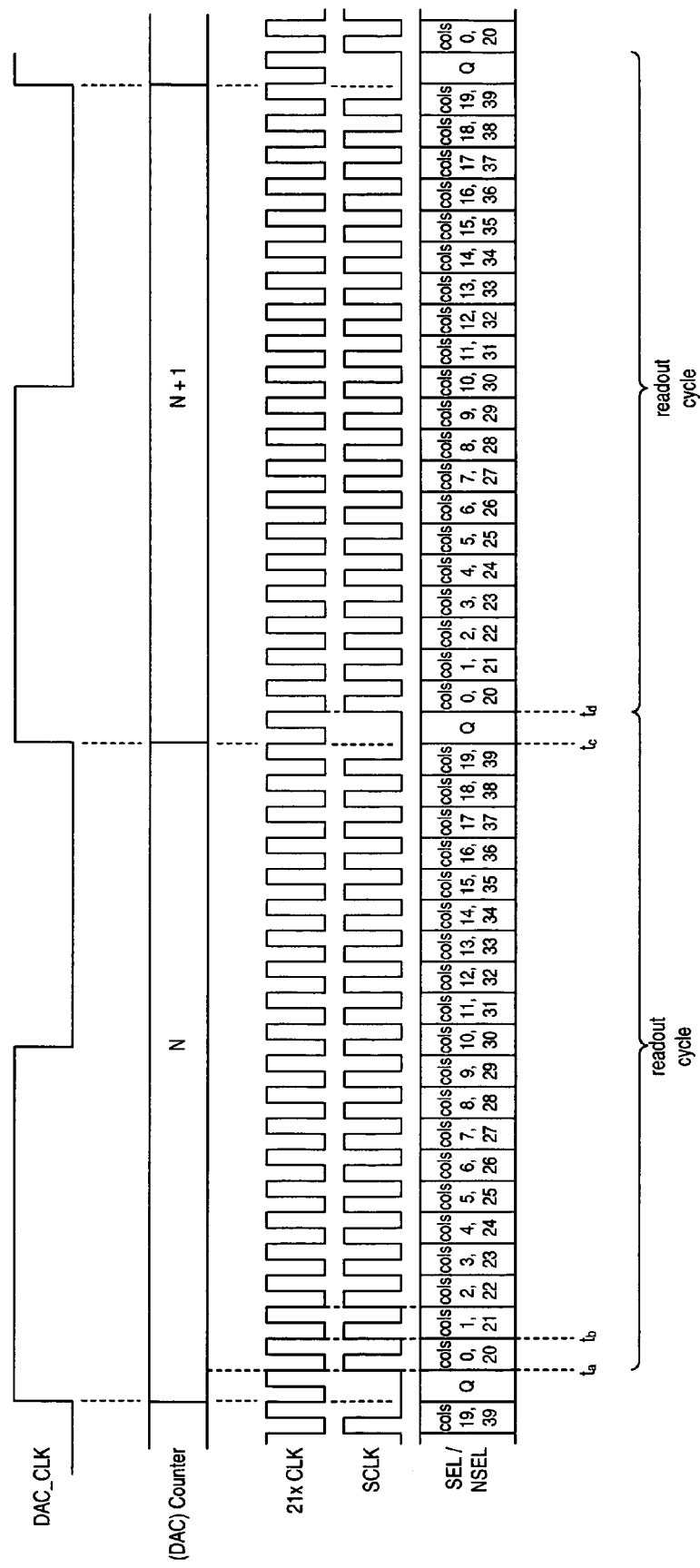
FIG. 6 is a timing diagram showing two readout cycles for an embodiment such as that of FIG. 5.

This is further explained in FIGS. 5 and 6. FIG. 5 is a block diagram of an array 3, RAM 4L and RAM 4R. For simplicity, all pixels and storage elements are not shown. Vertical and horizontal ellipses are used to represent the presence of additional pixels or storage elements. As shown in FIG. 5, pixels on the left side of each row (i.e., pixels in columns 0 through 19) are connected to a row output line communicating with storage elements on the same row of RAM 4L. For example, pixels in row 39, columns 0 through 19 are connected to output line L39; output line L39 is further connected to each storage element in row 39 of RAM 4L. Similarly, pixels on the right side of each row (i.e., pixels in columns 20 through 39) are connected to a row output line (i.e., one of output lines R0 through R39) communicating with storage elements on the same row of RAM 4R. Each column of array 3 is coupled to a separate SEL signal line and to a separate NSEL signal line. During each readout cycle of array 3, decoder 35 (FIG. 2) sequentially sends a high SEL signal (and a low NSEL signal) to one of the columns on each side of array 3 while transmitting a low SEL signal (and high NSEL signal) to the remaining columns. Each readout cycle spans a single cycle of the DAC_CLK signal. In other words, for each of the 256 values of the REF signal (see FIGS. 2-4), the amplified DIFF signal values from each column of pixels in array 3 are read into a corresponding column of storage elements in RAM 4L or RAM 4R.

FIG. 6 is a timing diagram for two readout cycles from array 3. The DAC_CLK signal is shown on the top line of FIG. 6. The next line of FIG. 6 indicates the value of the counter signal output from counter signal generator 34 (FIG. 2) to each storage element in RAMS 4L and 4R during the current DAC_CLK cycle. At the beginning of the first readout cycle shown in FIG. 6, the counter value is N. The counter value is N+1 at the beginning of the next readout cycle. The next line in FIG. 6 is a 21× version of the DAC_CLK signal used to generate the SCLK signal (fourth line of FIG. 6), which is in turn used by decoder 35 to generate the SEL and NSEL signals. The fifth line of FIG. 6 indicates which columns of the array are receiving a high SEL/low NSEL at various times.

One 21× clock cycle after the beginning of a DAC_CLK cycle (and thus a new value for REF and the counter signal), the SCLK signal goes high at time $t_a$. Also at time $t_a$, decoder 35 sends a high SEL signal on the SEL signal lines for columns 0 and 20 and a low NSEL signal on the NSEL signal lines for those columns. All other columns receive a low SEL signal and a high NSEL signal. Controller 30 also addresses the columns of storage elements in RAMS 4L and 4R corresponding to columns 0 and 20 of array 3. In at least some embodiments, controller 30 addresses those RAM columns by transmitting a high SEL signal to those columns and a low SEL signal to all other RAM columns. Each of the pixels in column 0 and in column 20 receiving a high SEL/low NSEL thus transmits an amplified value of its DIFF signal to a separate storage element. If that signal is high (indicating the INT and REF voltages in that pixel have not crossed), the storage element contains the N value of the counter signal. If that signal is low, the storage element maintains the value of the counter signal at the time when that signal initially went low during the current imaging cycle.

On the rising edge of the next SCLK cycle at time $t_b$, decoder 35 sends high SEL and low NSEL signals on the lines for columns 1 and 21; all other columns receive a low SEL and a high NSEL. Controller 30 also addresses the columns of storage elements in RAMS 4L and 4R corresponding to columns 1 and 21 of array 3. This continues until high SEL signal and low NSEL signals have been sent on the lines for columns 19 and 39 (and corresponding columns of RAMS 4L and 4R addressed) so as to read all columns of the array. After all columns have been read (time $t_c$), the SEL and NSEL signals are held at the value for reading columns 19 and 39 for an interval ("Q") equal to one cycle of the 21× clock. This allows the comparators within pixels of array 3 to settle while preventing the output nodes from floating. The next DAC_CLK cycle begins at $t_c$. At the end of the Q interval (time $t_d$), the readout cycle corresponding to the next DAC_CLK cycle and the next value (N+1) of the counter signal begins. Specifically, decoder 35 sends high SEL and low NSEL signals to columns 0 and 20, sends low SEL signals high NSEL signals to the other array 3 columns, and addresses the columns of storage elements in RAMS 4L and 4R corresponding to columns 0 and 20 of array 3.

Returning to FIG. 4, readout cycles continue until the REF signal reaches its lowest value at time $t_4$. The total time for the REF signal to go from the high value ($t_2$) to the low value ($t_4$) is chosen such that there is a sufficiently wide range of counter signal values between the darkly lit pixels (which may have little or no drop in INT voltage) and brightly lit pixels (which may have a large drop in INT voltage). At time $t_5$, NRESET again goes low, and each pixel's node 42 and node 46 are connected. The REF signal is brought high, node 46 of each pixel is charged to the REF signal voltage (except for individual offsets), and the pixel array is ready for another imaging cycle frame.

Figure 7A:
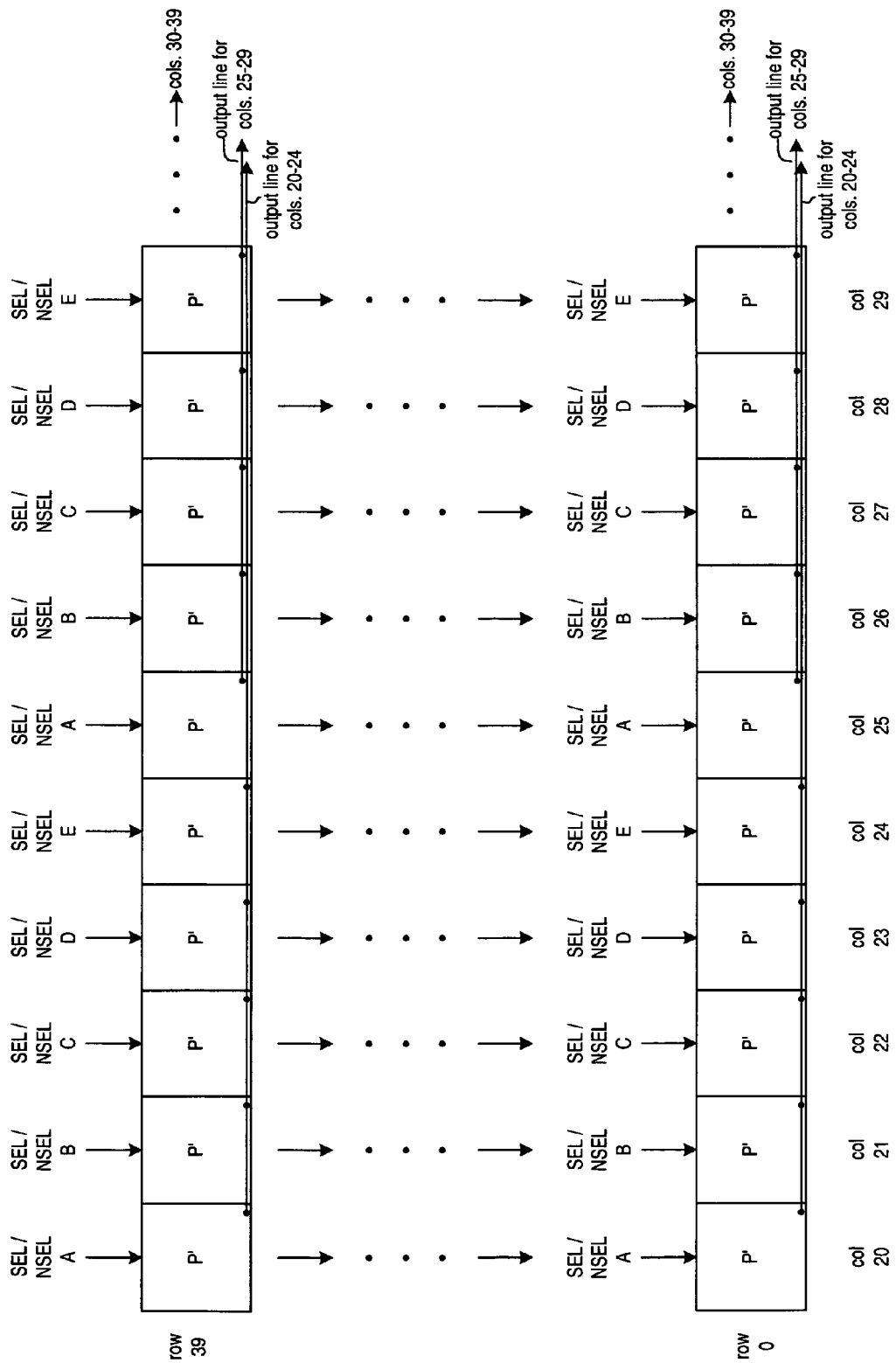
FIGS. 7A and 7B are block diagrams illustrating readout from pixels to storage elements according to at least some additional exemplary embodiments.
Figure 7B:
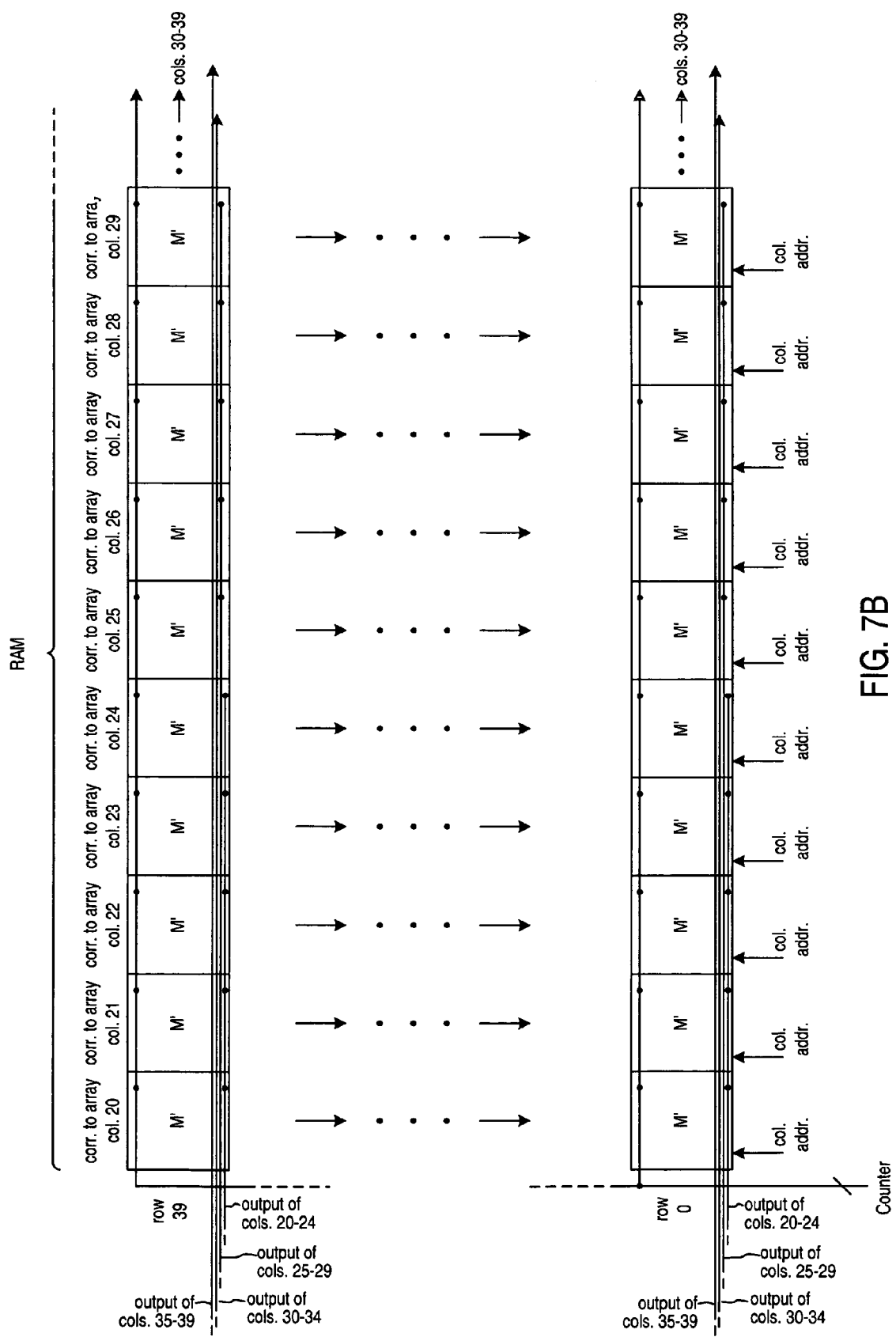
Figure 8:
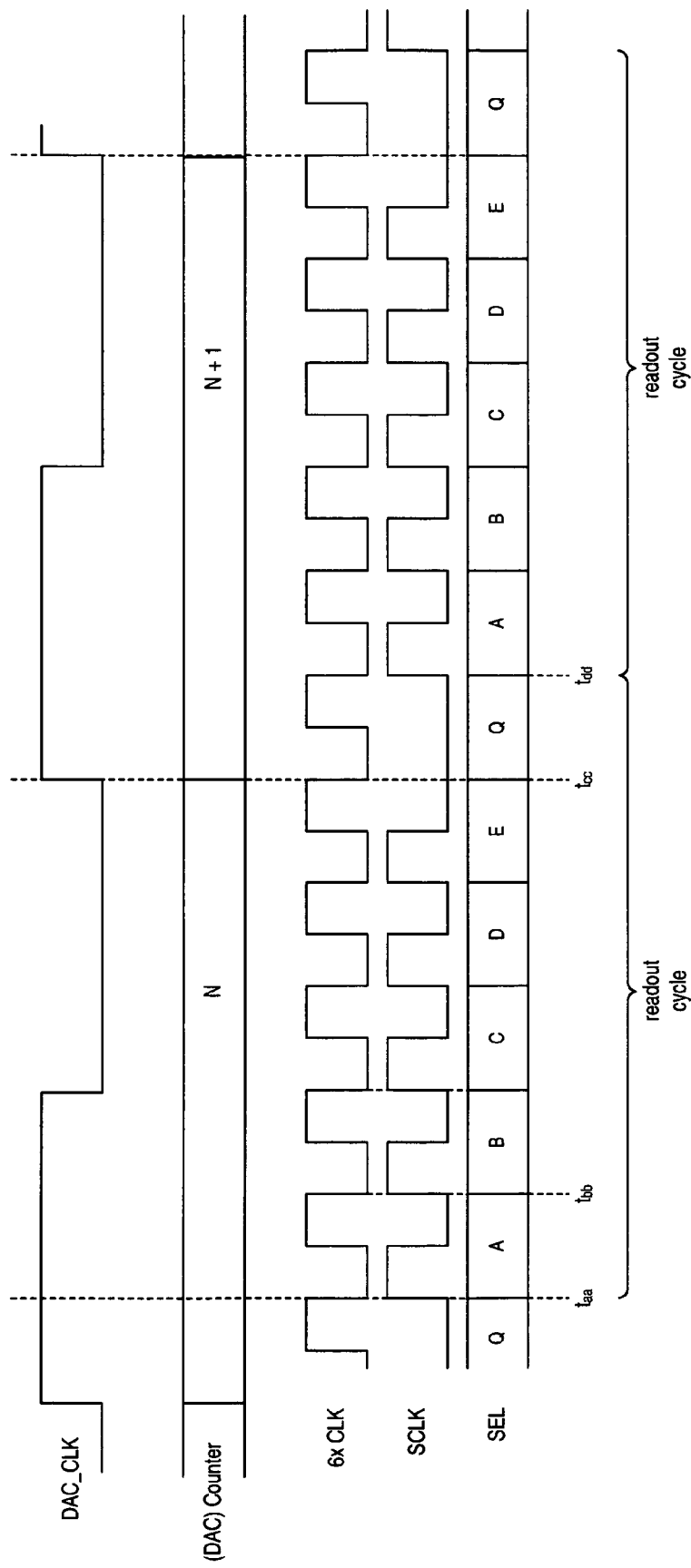
FIG. 8 is a timing diagram showing two readout cycles for an embodiment such as that of FIGS. 7A-7B.

As can be appreciated from FIG. 6, the above-described embodiment requires a relatively high-speed clock signal during readout from array 3. In some cases (particularly for very large arrays), a lower readout clock signal may be desirable. FIGS. 7A through 8 illustrate a variation on the embodiment of FIGS. 1-6 in which a slower readout signal is implemented. For simplicity, FIG. 7A only shows columns 20-39 of a 40×40 array of pixels similar to array 3 of FIG. 1, and FIG. 7B only shows storage element columns of RAM corresponding to columns 20-29 of the pixel array. Pixels P' and storage elements M' in FIGS. 7A and 7B are similar to pixel P and storage element M of FIGS. 2 and 3. Unlike the embodiment of FIGS. 1-6, however, only five pixels in each row of the array in FIG. 7A are connected to a row output line. Each output line is further connected to five storage elements M' in RAM. Thus, the pixels in columns 20-24 of row 39 (FIG. 7A) are connected to an output line connected to the first five storage elements in row 39 of RAM (FIG. 7B). Pixels in columns 25-29 are connected to an output line corresponding to the next five storage elements M' in row 39 of RAM. Pixels in columns 30-34 (not shown in FIG. 7A) are connected to the next five storage elements (also not shown) in the RAM row 39, and pixels in columns 35-39 (also not shown) are connected to the last five storage elements (not shown) in the RAM row 39. A similar pattern follow for each row. As in FIG. 5, vertical and horizontal ellipses are used to represent the presence of additional pixels and storage elements. Pixels in columns 0-19 and storage elements in RAM on the other side of the array are arranged in a mirror image of the configuration shown in FIGS. 7A and 7B.

Although not separately shown, an IC for the embodiment of FIGS. 7A and 7B is laid out similar to IC 2 of FIG. 1. The REF and counter signal generators (also not shown) for the embodiment of FIGS. 7A-7B operate in a manner similar to generators 32 and 34 of FIG. 2. The controller and decoder of the FIGS. 7A-7B embodiment (not shown) also operate similar to controller 30 and decoder 35 of FIG. 2, but are slightly modified. In particular, the controller and decoder for the FIGS. 7A-7B embodiment are configured to read out the contents of the array according to the timing chart of FIG. 8. As in FIG. 6, the DAC_CLK signal is shown on the top line of FIG. 8. The next line of FIG. 8 indicates the value of the counter signal output from the counter signal generator to each element M' in the right side RAM of FIG. 7A (including unshown elements corresponding to array columns 30-39) and to similar elements (not shown) in a RAM on the left side of the array. As in FIG. 6, the counter signal value is N at the beginning of the first readout cycle of FIG. 8, and is N+1 at the beginning of the next readout cycle. The next line in FIG. 8 is a 6× version of the DAC_CLK signal used to generate a SCLK signal (fourth line), which is in turn used by the decoder to generate the SEL and NSEL signals. The fifth line of FIG. 8 indicates which columns of the array are receiving a high SEL/low NSEL at various times.

Unlike the decoder in FIG. 2, the decoder in the embodiment of FIGS. 7A through 8 generates SEL and NSEL signals in five groups A, B, C, D and E. Specifically, a subset of columns in the array correspond to group A; the columns in the group A subset simultaneously receive the same SEL and NSEL signals. Another subset of columns corresponds to group B, with all columns in the group B subset simultaneously receiving the same SEL and NSEL signals. A similar pattern follows for groups C, D and E.

One 6× clock cycle after the beginning of a DAC_CLK cycle (and thus a new value for REF), the SCLK signal goes high at time $t_{aa}$. Also at time $t_{aa}$, the decoder sends a high SEL signal and a low NSEL signal to pixels in the columns of group A (columns 0, 5, 10, 15, 20, 25, 30 and 35). All other column groups receive a low SEL signal and a high NSEL signal. Controller 30 further addresses the columns of RAM corresponding to the group A columns. In at least some embodiments, the SEL signal is used as the storage column addressing signal, with each array column and its corresponding RAM column receiving the same SEL signal. Each of the pixels in a group A column transmits an amplified value of its DIFF signal to a corresponding storage element. If that signal is high (indicating the INT and REF voltages in a pixel have not crossed), the storage element contains the N value of the counter signal. If that signal is low, the storage element maintains the value of the counter signal at the time when that amplified DIFF signal initially went low for the pixel during the present imaging cycle.

On the rising edge of the next SCLK cycle at time $t_{bb}$, the decoder sends high SEL and low NSEL signals to the pixels in the group B columns (1, 6, 11, 16, 21, 26, 31, 36), sends a low SEL signal and a high NSEL signal to all other column groups, and addresses the RAM columns corresponding to the group B columns of the pixel array. This pattern continues until the pixels of the group C (2, 7, 12, 17, 22, 27, 32, 37), group D (3, 8, 13, 18, 23, 28, 33 and 38) and group E (4, 9, 14, 19, 24, 29, 34 and 39) columns have been read out. After all columns have been read (time $t_{cc}$), the SEL and NSEL signals are held at the value for reading the group E columns for an interval ("Q") equal to one cycle of the 6× clock. The next DAC_CLK cycle begins at $t_{cc}$. At the end of the Q interval (time $t_{dd}$), the readout cycle corresponding to the next DAC_CLK cycle and the next value (N+1) of the counter signal begins. Specifically, the decoder sends high SEL and low NSEL signals to the group A columns, sends low SEL signals high NSEL signals to the other column groups, and addresses the columns of storage elements corresponding to the group A columns. The pattern continues for following readout cycles until the REF signal reaches its lowest value.

As can be appreciated from the preceding description, the embodiment of FIGS. 7A through 8 allows operation of a pixel array using a lower speed readout clock. Although the embodiment of FIGS. 7A through 8 does have more output lines than the embodiment of FIGS. 1-6, relatively high fill factors (e.g., 70% or more) are still achievable. In variations on the embodiment of FIGS. 7A through 8, more or fewer columns of pixels are simultaneous read out into RAM storage elements. For example, one embodiment having a 40 pixel by 40 pixel array has four pixel column groups, with each horizontal output line connected to four pixels and four storage elements. As but another example, another embodiment having a 40 pixel by 40 pixel array has two pixel column groups, with each horizontal output line connected to ten pixels and to ten storage elements.

Figure 9:
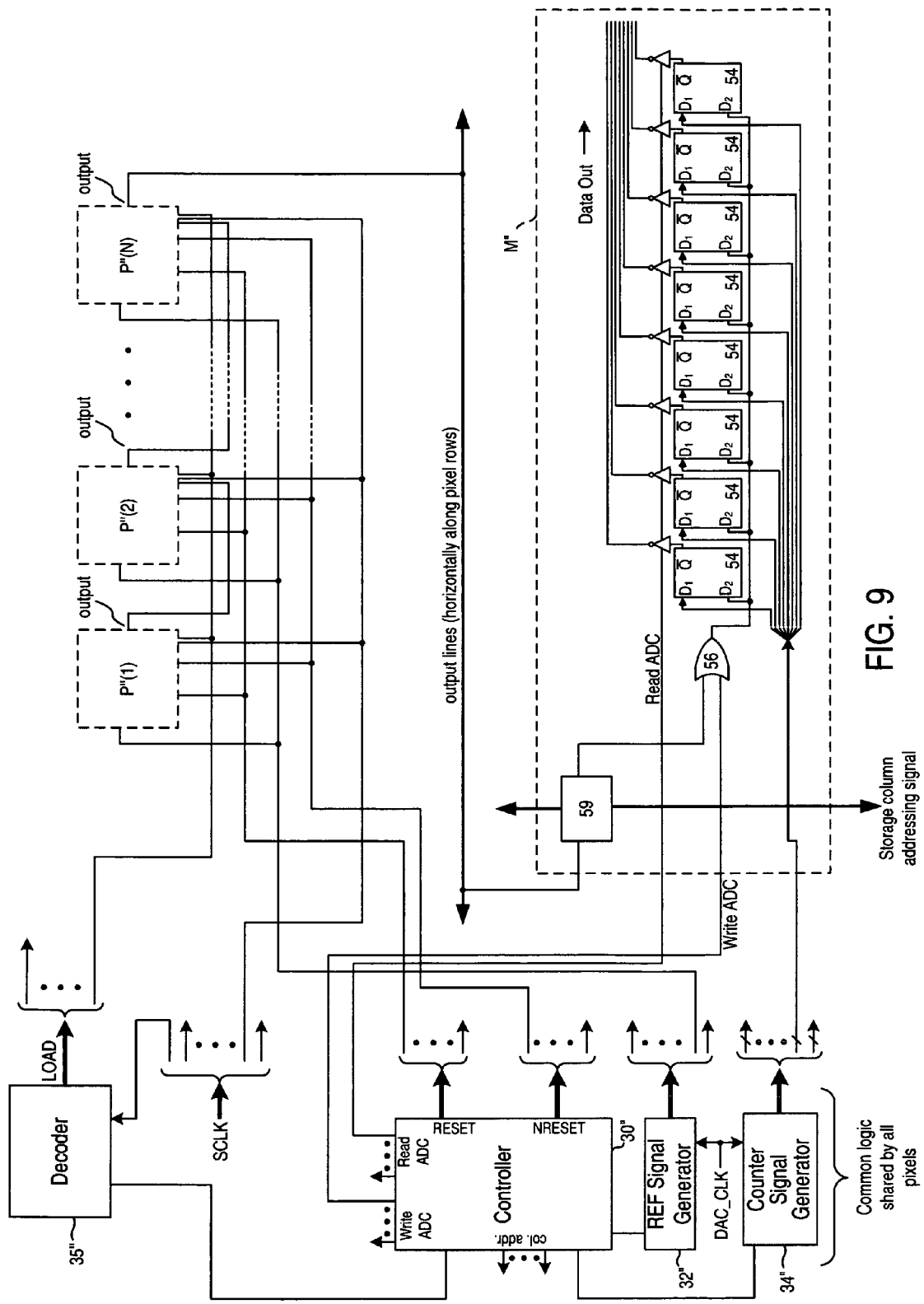
FIG. 9 is a block diagram showing several pixels and a corresponding storage element according to at least some additional embodiments.

FIGS. 9-12 illustrate another embodiment. In the embodiment of FIGS. 9-12, the outputs from a portion of the pixels in each row are serially shifted to one of multiple storage elements connected to a common output line. FIG. 9 is a block diagram showing three pixels and various other components of an imaging IC according to at least some embodiments. Pixels P"(1), P"(2), ... P"(N) (where N is an arbitrary integer) lie along a row of a pixel array in the IC. The output from pixel P"(1) is shifted to pixel P"(2), the output pixel P"(2) shifted to pixel P"(3) (not shown), etc., with the output of pixel P"(N−1) (also not shown) shifted to pixel P"(N). The output from pixel P"(N) is provided, via a horizontal output line, to one of multiple storage elements M" connected to that output line. Only one element M" is shown in FIG. 9. A decoder 35" provides LOAD signals on multiple LOAD signal lines to pixels in the array; the purpose of the LOAD signals is explained below. REF signal generator 32 and counter signal generator 34 operate in a manner similar to REF signal generator 32 and counter signal generator 34 of FIG. 2. The internal components and operation of storage element M" are also similar to those of storage element M of FIG. 2. Controller 30" operates similar to controller 30 of FIG. 2, except that controller 30" is modified so as to control the operation of the IC of FIG. 9 as described below. Although not separately shown, an IC for the embodiment of FIG. 9 is laid out similar to IC 2 of FIG. 1.

Figure 10:
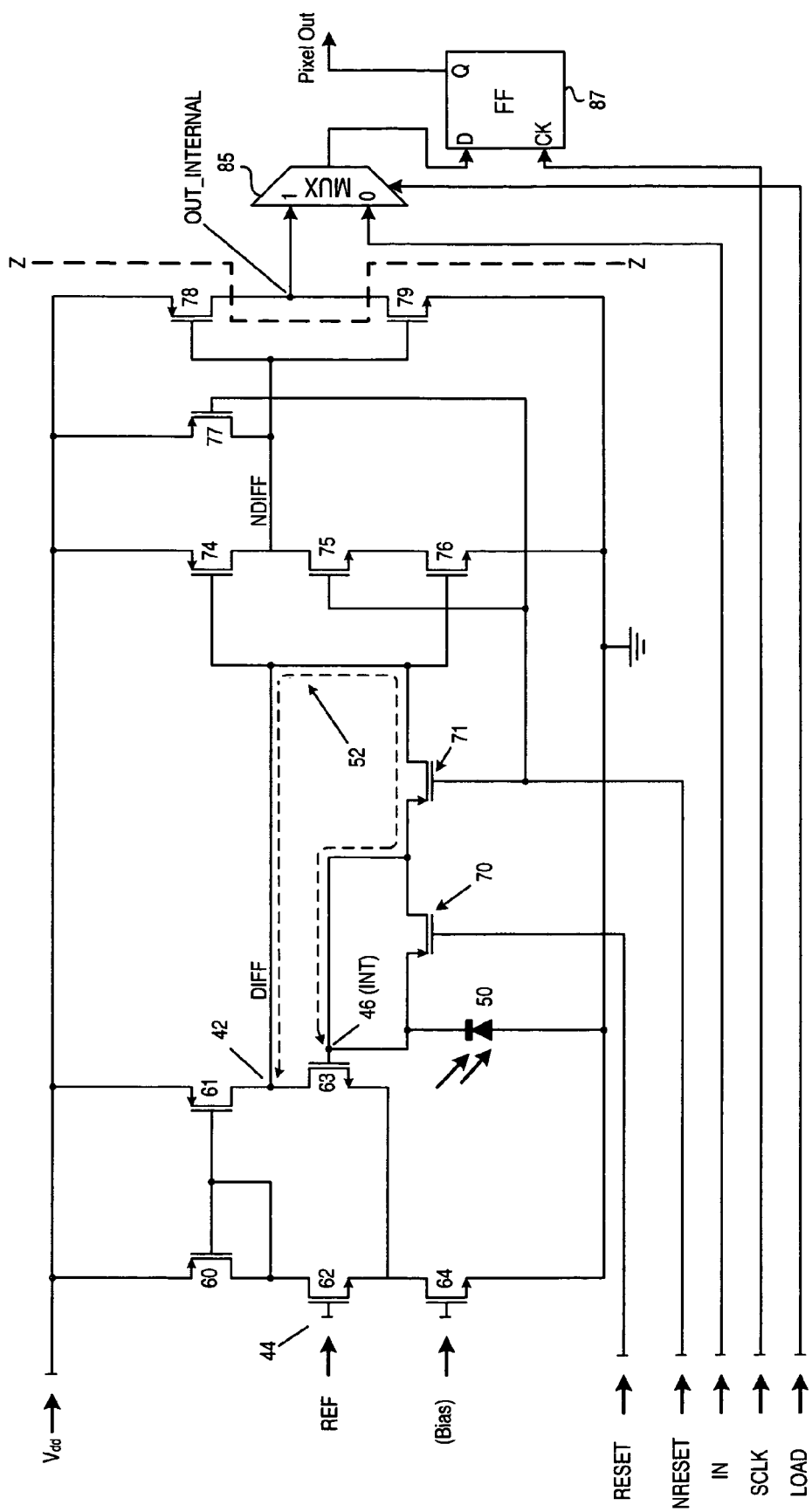
FIG. 10 is a schematic diagram of a pixel according to an embodiment such as that of FIG. 9.

FIG. 10 is a schematic diagram for pixel P'''(2), and is also representative of other pixels in an array in the FIG. 9 embodiment which are not at the beginning of a serial scan chain (e.g., pixel P'''(1)). Pixels such as P'''(1) at the beginning of a scan chain are generally similar to pixel P'''(2), except that the 0 MUX input (the MUX is described below) is connected to ground. The elements of pixel P'''(2) to the left of dashed line Z-Z are generally the same as like numbered elements of pixel P in FIG. 3 and operate in the same manner in response to the REF, RESET and NRESET signals (and illumination) as was described in connection with FIGS. 3 and 4.

Unlike pixel P, however, pixel P'''(2) includes a multiplexer (MUX) 85 and flip-flop (FF) 87. The input to the first port of MUX 85 (marked "1") is the OUT_INTERNAL signal. The "IN" signal provided to the other port of MUX 85 (marked "0") is the output (PIXEL OUT) from a neighboring pixel (e.g., pixel P'''(1)). The output of MUX 85 is controlled by the LOAD signal. When LOAD is high, MUX 85 outputs the OUT_INTERNAL signal. When LOAD is low, MUX 85 outputs the IN signal (i.e., the PIXEL OUT signal from a neighboring pixel). The output of MUX 85 is fed to the D input of FF 87. The CK input to FF 87 is the SCLK signal. The output from FF 87 (Q) is provided to the "0" input of a MUX in another neighboring pixel (e.g., pixel P'''(3), not shown in FIG. 9).

Inclusion of a MUX and FF in adjoining pixels forms a serial shift register, thereby allowing digital outputs for multiple neighboring pixels to be shifted to external circuitry (e.g., a storage element M'') over a single wire. When LOAD is a logical 1, the 1-bit OUT_INTERNAL value is loaded into the FF. When LOAD is a logical 0, neighboring pixels operate a digital shift register on every SCLK edge. On a single SCLK edge in the embodiment of FIGS. 9 and 10, the output from pixel P'''(1) is shifted to the FF of pixel P'''(2), the output of pixel P'''(2) is shifted to the FF of pixel P'''(3), etc., with the output of pixel P'''(N) shifted to a storage element M'' receiving a storage column addressing signal from controller 30''. On the next SCLK edge (while LOAD is 0), the values in the FFs are again shifted, but a different storage element is addressed.

Figure 11A:
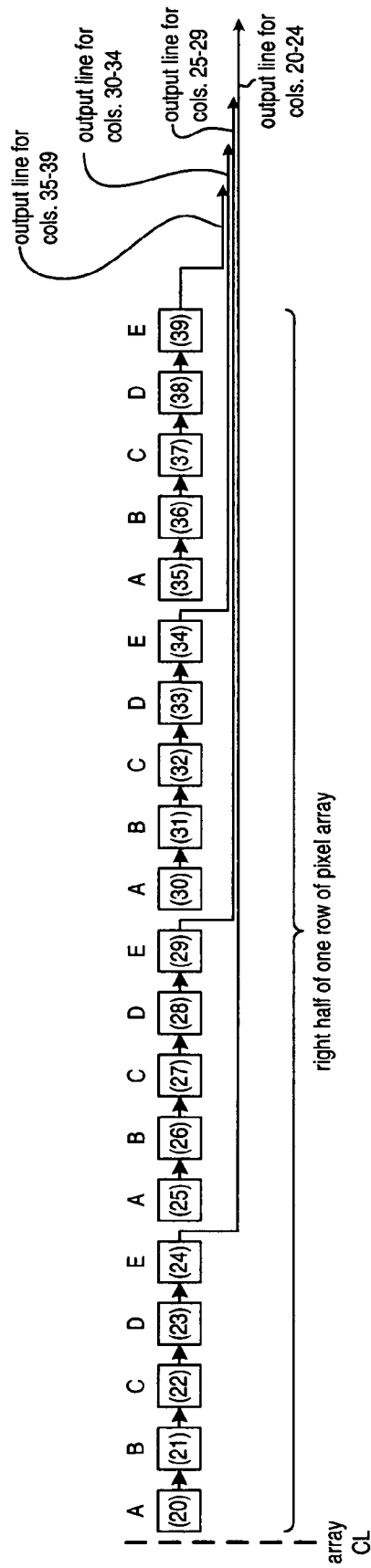
FIGS. 11A and 11B are block diagrams illustrating readout from pixels to storage elements according to at least some exemplary embodiments incorporating pixels such as that of FIG. 10.
Figure 11B:
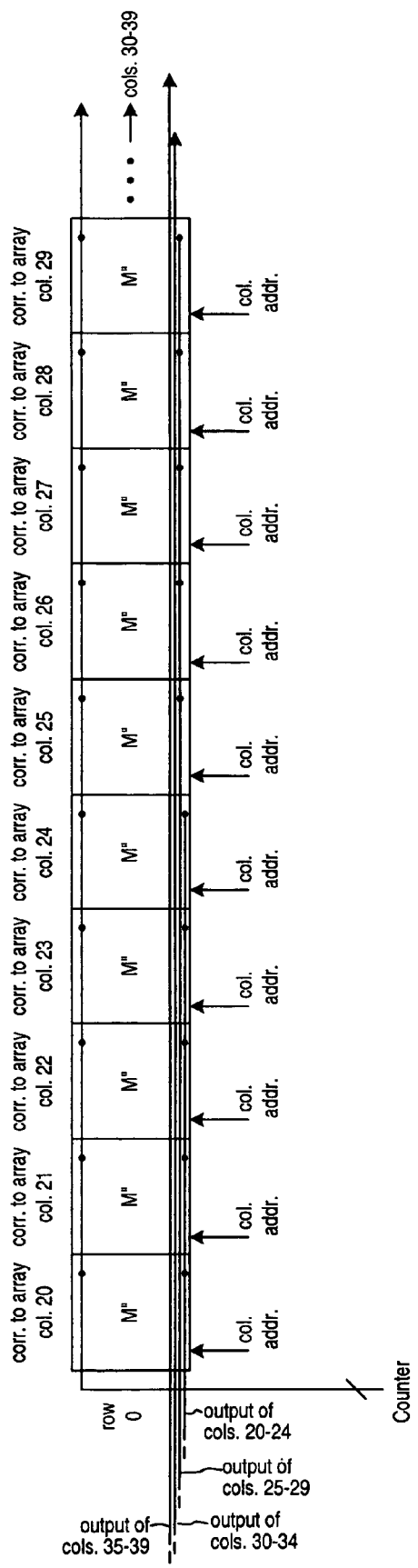

FIGS. 11A and 11B show how, according to at least some embodiments, the serial shift register of FIGS. 9 and 10 may be implemented. Shown in FIG. 11A is the right half of a single row of a 40×40 pixel array. Other half rows on the right side are similarly configured and operate as described below. Half rows on the left side of the array are also similarly configured and operate as described below, but are mirrored about the array centerline. For simplicity, the "P'''" is omitted from each of the pixels in FIG. 11A, and only the column numbers (i.e., "(20)," "(21)," etc.) are shown. Pixels P'''(20) through P'''(24) form a serial scan chain connected to a first output line. In other words, the PIXEL OUT signal from pixel P'''(20) is the IN signal for pixel P'''(21), the PIXEL OUT signal from pixel P'''(21) is the IN signal for pixel P'''(22), the PIXEL OUT signal from pixel P'''(22) is the IN signal for pixel P'''(23), the PIXEL OUT signal from pixel P'''(23) is the IN signal for pixel P'''(24), and the PIXEL OUT signal from P'''(24) is provided to one of five storage elements M'' in FIG. 11B. In a similar manner, pixels P'''(25) through P'''(29) form a serial scan chain connected over a single output line to another five storage elements M'', pixels P'''(30) through P'''(34) form a serial scan chain connected over a single output line to yet another five storage elements, and pixels P'''(35) through P'''(39) form a serial scan chain connected over a single output line to a fourth group of five storage elements.

Figure 12:
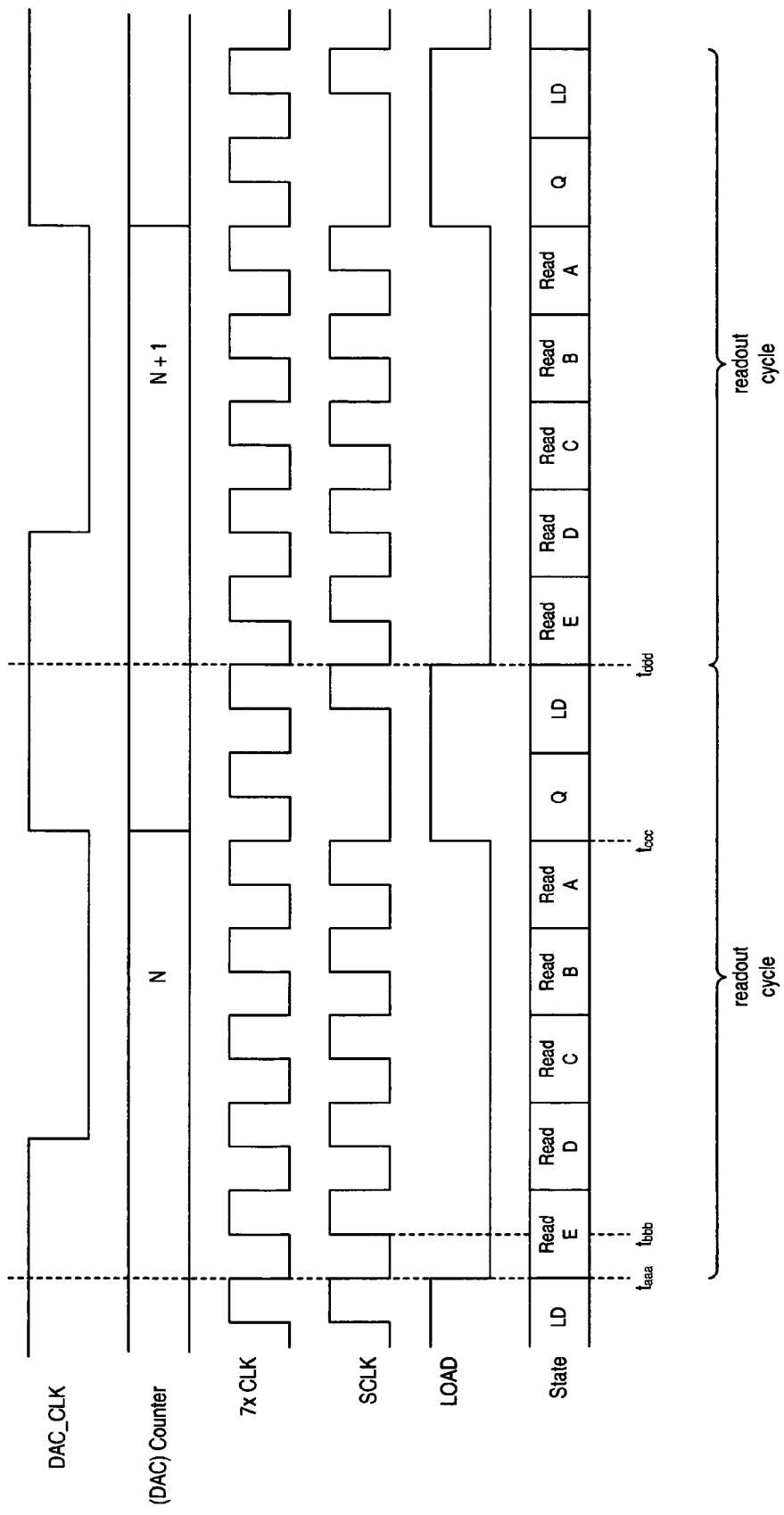
FIG. 12 is a timing diagram showing two readout cycles for an embodiment such as that of FIGS. 11A-11B.

FIG. 12 is a timing chart showing two readout cycles from an array in an embodiment according to FIGS. 9-11B. As with FIGS. 6 and 8, the DAC_CLK signal is shown on the top line of FIG. 12, with the value of the counter signal output from the counter signal generator 34'' shown on the next line. The next line in FIG. 12 is a 7× version of the DAC_CLK signal used to generate a SCLK signal (fourth line), which is in turn used by the decoder 35'' to generate the LOAD signals (fifth line). The sixth line indicates which pixel of a scan chain is being read into a storage element at various times. A DAC_CLK cycle begins approximately two 7× clock cycles prior to time $t_{aaa}$. During the two 7× clock cycles prior to time $t_{aaa}$, the LOAD signal is high, and the OUT_INTERNAL signal of each pixel is fed through its respective MUX 85 (see FIG. 10) to its FF 87. At time $t_{aaa}$, the LOAD signal goes low, and controller 30'' addresses the storage elements corresponding to pixels in group E columns (e.g., storage elements corresponding to pixels in columns 24, 29, 34 and 39 are addressed). At time $t_{bbb}$, the SCLK signal goes high, and the values in the FFs within the pixels are shifted to the right. In particular, the value in the FFs of the E column pixels (P'''(24), P'''(29), P'''(34) and P'''(39)) are respectively shifted into their corresponding storage elements M''. Moreover, the values in the D column pixel FFs are shifted to the E column pixel FFs, the values in the C column pixel FFs are shifted to the D column pixel FFs, the values in the B column pixel FFs are shifted to the C column pixel FFs and the values in the A column pixel FFs are shifted to the B column pixel FFs.

This pattern continues until the pixels of the group A columns have been read out. After all columns have been read (time $t_{ccc}$), a low SCLK signal is sent to all pixels for an interval ("Q") equal to one cycle of the 7× clock, and the LOAD signal is brought high. At time $t_{ddd}$ the next readout cycle (corresponding to the next DAC_CLK cycle and the N+1 value of the counter signal) begins. The pattern then continues for following readout cycles until the REF signal reaches its lowest value.

As can be readily appreciated by persons skilled in the art (in view of the above discussion), the embodiment of FIGS. 9 through 12 can be readily adapted to include more or fewer pixels in each serial scan chain. As but one example, all of the pixels shown in FIG. 11A could be in a single scan chain of twenty pixels instead of four scan chains of five pixels.

Figure 13:
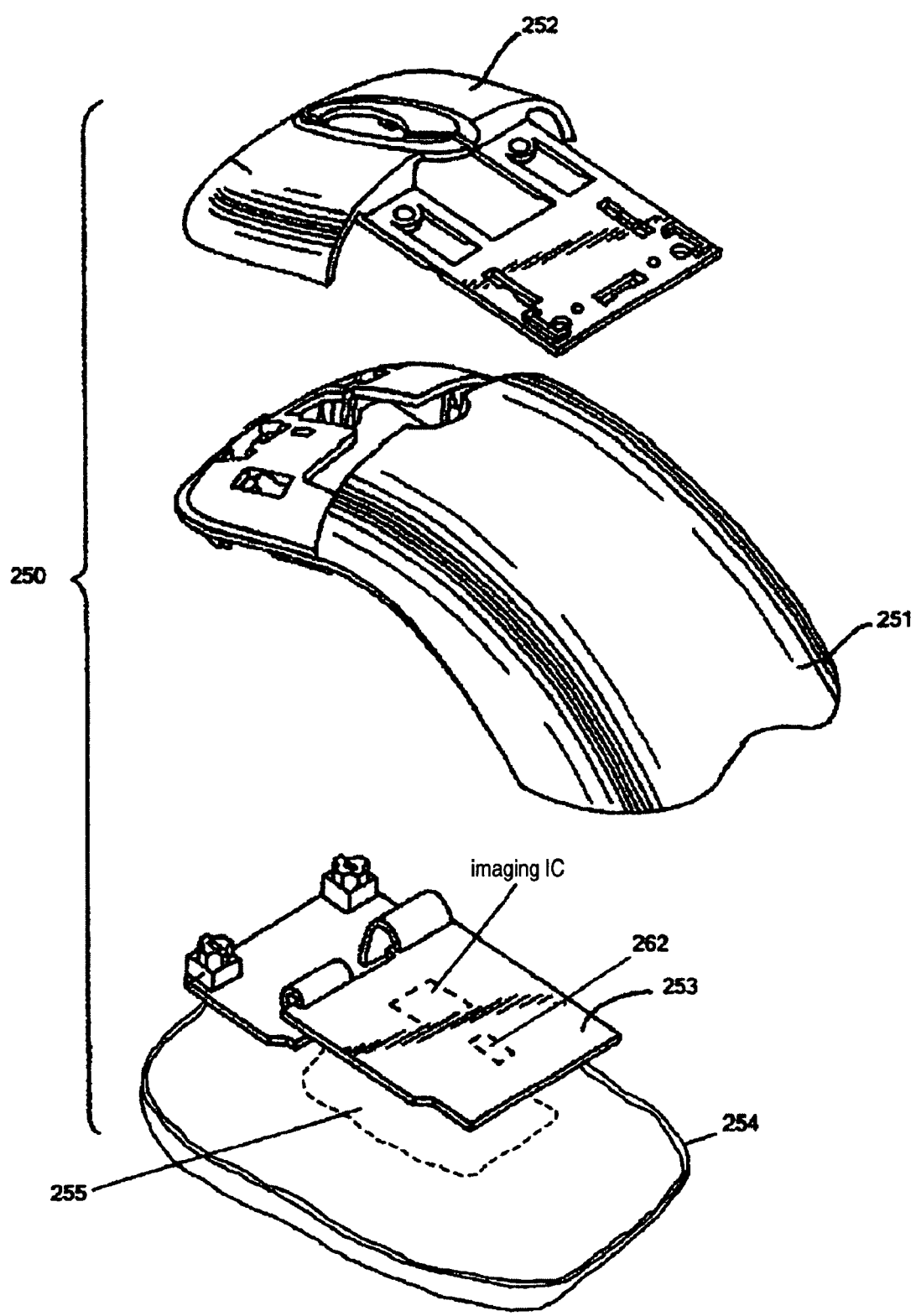
FIGS. 13 and 14 show a computer mouse incorporating an imaging chip according to various exemplary embodiments.
Figure 14:
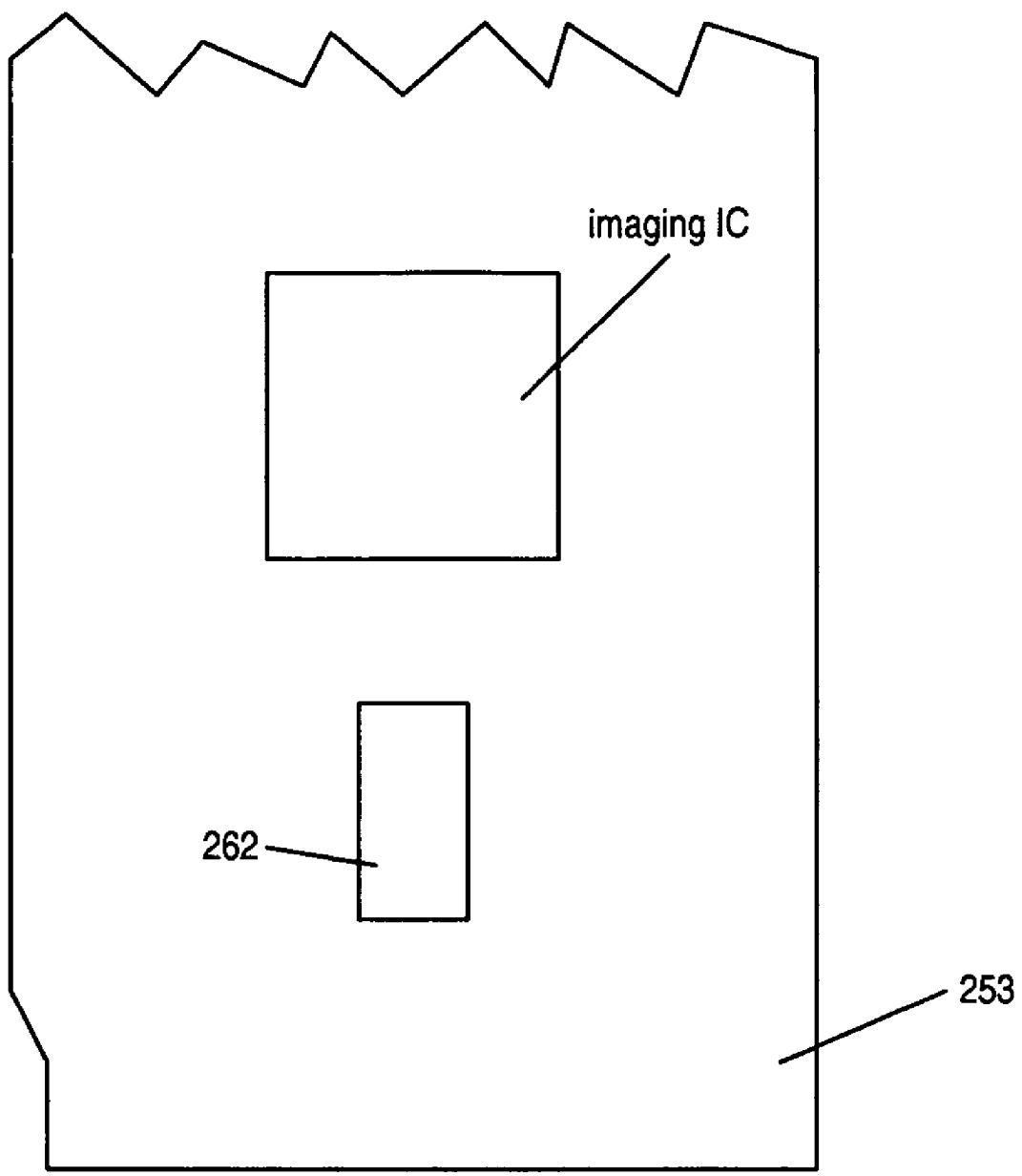

An image sensor according to the various embodiments can be used for motion detection, and more specifically, as part of a computer input or pointing device. Such devices include computer mice, trackballs and other devices which track movement. FIG. 13 shows an example of one possible implementation in a computer mouse of an image sensor according to the invention. Illustrated in FIG. 13, in an exploded perspective view, are several major components of a typical mouse 250. Mouse 250 includes an upper case 251, a set of keys 252, a circuit board 253, and a lower case 254. Other components of mouse 250 are not shown, but could include a power source (for battery powered mice), a cable for communication with a computer (if not a wireless device), a scroll wheel and other mechanical components, and various other components known in the art. As is also known in the art, a user operates mouse 250 by moving mouse 250 over a desktop or other surface. The underside of lower case 254 is in contact with the desktop or other surface, and is either transparent or includes a transparent portion 255. A lens or other focusing element (not shown) could also be located between the transparent portion 255 and circuit board 253, or incorporated into transparent portion 255. Located on the underside of circuit board 253 are an imaging IC (shown in outline in FIG. 13) and a LED 262 (also shown in outline in FIG. 13). As laser could alternatively be employed instead of LED 262. The imaging IC in FIG. 13 is an IC according to any of the embodiments described above. In operation, light from LED 262 reflects from a desk top or other surface, shines through transparent region 255 (and a focusing element, if present), and is received by a pixel array located on the imaging IC. FIG. 14 is a partial view of the underside of circuit board 253 showing the imaging IC and LED 262. Image data obtained from the imaging IC during multiple imaging cycles can be compared, and the direction and magnitude of motion of mouse 250 with respect to a desktop (or other surface) calculated.

The mouse of FIGS. 13 and 14 is but one example of an application employing an imaging array according to various embodiments. The invention is not limited to such applications. Imaging arrays as described above could also be utilized in numerous other applications in which high speed imaging is desired. Examples include, but are not limited to, object recognition and other computer vision applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Those skilled in the art will appreciate that there are numerous variations and permutations of the above described systems and techniques that fall within the spirit and scope of the invention as set forth in the appended claims. As but one example, various embodiments include arrays of pixels having other dimensions (e.g., 128 pixels by 128 pixels, 256 pixels by 256 pixels, etc.). A pixel array need not be square, and the pixels and storage elements need not be arranged symmetrically. In the claims, the terms "row" and "column" are merely used to distinguish between elements of an array oriented in one direction and elements oriented in another direction. The use of these terms in the claims should not be interpreted as requiring that an imaging IC or other claimed device have a particular orientation with regard to some external reference. For example, a given IC may be configured to sequentially read entire pixel columns simultaneously. If considered from a different perspective, however, that same IC is instead configured to sequentially read entire pixel rows simultaneously.

The invention claimed is:

1. An image sensor, comprising:
    a pixel array located on a first portion of an integrated circuit (IC), the array including a plurality of pixels arranged in rows, wherein
    each pixel is configurable to output a first signal in response to illumination during each of multiple imaging cycles, and
    as to each pixel, the part of an imaging cycle during which the first signal is output depends upon an intensity of illumination of that pixel;
    a first group of pixel output lines, wherein each of the first group of pixel output lines corresponds to a different row of the array and is in communication with at least two of the pixels in the corresponding row;
    a signal generator configured to output a time-varying, multi-bit counter signal;
    a first group of multi-bit random access memory (RAM) storage elements displaced from the array on the IC, wherein each of the RAM storage elements
        is configurable to receive the counter signal,
        is associated with a different one of the first group of pixel output lines, and
        is configurable to store a value of the counter signal if the first signal is received on the pixel output line with which the storage element is associated; and
    a decoder connected to each column of the pixel array by a corresponding pair of first and second selection lines orthogonal to the first group of pixel output lines, the decoder configured to readout the array by outputting a column-specific first and second selection signals on corresponding first and second selection lines so as to cause pixels sharing a common pixel output line to time-muliplex corresponding pixel output signals.

2. The image sensor of claim 1, wherein the decoder is configured to read all outputs from all of the pixels during a readout cycle, and wherein each imaging cycle includes multiple readout cycles.

3. The image sensor of claim 2, further comprising additional pixel output lines and additional multi-bit storage elements, and wherein
    each of the additional pixel output lines corresponds to a row also corresponding to one of the first group of pixel output lines,
    each of the additional pixel output lines is in communication with a different portion of the pixels in the away,
    each of the pixels in communication with one of the additional pixel output lines lies in one of additional columns,
    each of the additional multi-bit storage elements is configurable to receive the counter signal, is associated with at least one of the additional pixel output lines, and is configurable to store a value of the counter signal if the first signal is received on the pixel output line with which the storage element is associated, and
    the decoder is configured to also read at least one of the additional columns when reading each of the first group of columns.

4. The image sensor of claim 3, wherein
    each of the pixel output lines is in communication with at least four pixels located in different ones of the columns,
    each row of the array corresponds to at least four pixel output lines associated with different ones of the storage elements, and
    the array is at least a 40 pixel by 40 pixel array.

5. The image sensor of claim 2, wherein
    each pixel includes a first and second switching transistor in communication with a corresponding pair of first and second selection lines, and
    the decoder is configured to separately read each of The first group of columns by sequentially transmitting a selection signal on different subsets of the selection signal control lines.

6. The image sensor of claim 2, further comprising a reference signal generator configurable to provide a reference signal varying through multiple voltage levels during an imaging cycle, and wherein
    each of the pixels includes a photosensor having an electrical property which varies in response to intensity of illumination and a first circuit configurable for operation as a comparator, the first circuit having first and second input nodes and an output node,
    the first input node of the first circuit within each pixel is connected to the photosensor in the same pixel,
    the second input node of the first circuit within each pixel receives the reference signal,
    the first signal as to each pixel corresponds to a voltage at the output node of the same pixel, and
    each of the multiple voltage levels corresponds to a separate readout cycle.

7. The image sensor of claim 1 wherein, as to each of the first group of pixel output lines,
the pixels in communication with the output line form a serial scan chain,
the decoder is configured to sequentially shift The outputs of all pixels in the scan chain out of the array during each readout cycle.

8. The image sensor of claim 7, further comprising additional pixel output lines and additional multi-bit storage elements, and wherein
each of the additional pixel output lines corresponds to a row also corresponding to one of the first group of pixel output lines,
each of the additional pixel output lines is in communication with a different portion of the pixels in the array,
as to each of the additional pixel output lines, the pixels in communication with the output line form a serial scan chain,
each of the additional multi-bit storage elements is configurable to receive the counter signal, is associated with at least one of the additional pixel output lines, and is configurable to store a value of the counter signal if the first signal is received on the pixel output line with which the storage element is associated, and
the decoder is configured to sequentially shift the outputs of all pixels in each of the scan chains out of the array during each readout cycle.

9. The image sensor of claim 7, wherein
at least a portion of the pixels in each of the scan chains includes
a multiplexer receiving an output from another pixel in the same scan chain and also receiving a first control signal, and
a flip-flop receiving an output from the multiplexer and also receiving a second control signal, and
the decoder is configured to load each of the flip flops by sending the first control signal and to sequentially shift the outputs of all pixels in each scan chain by sending the second control signal.

10. The image sensor of claim 7, further comprising a reference signal generator configurable to provide a reference signal varying through multiple voltage levels during an imaging cycle, and wherein
each of the pixels includes a photosensor having an electrical property which varies in response to intensity of illumination and a first circuit configurable for operation as a comparator, the first circuit having first and second input nodes and an output node,
the first input node of the first circuit within each pixel is connected to the photosensor in the same pixel,
the second input node of the first circuit within each pixel receives the reference signal,
the first signal as to each pixel corresponds to a voltage at the output node of the same pixel, and
each of the multiple voltage levels corresponds to a separate readout cycle.

11. The image sensor of claim 7, wherein
each of the pixel output lines is in communication with at least four pixels located in different ones of the columns,
each row of the array corresponds to at least four pixel output lines associated with different ones of the storage elements, and
the array is at least a 40×40 array.

12. The image sensor of claim 1, further comprising:
a computer mouse case;
a light source contained within the mouse case; and
a circuit board within the mouse case supporting the image sensor.

13. An image sensor, comprising:
a pixel array located on a first portion of an integrated circuit (IC), the array including a plurality of pixels arranged in rows, and wherein
each pixel is configurable to output a first signal in response to illumination during each of multiple imaging cycles,
as to each pixel, the part of an imaging cycle during which the first signal is output depends upon an intensity of illumination of that pixel, and
the pixels form a group of columns, the group of columns including multiple different subgroups;
a group of pixel output lines, wherein each of the group of pixel output lines corresponds to a different row of the array and is in communication with at least two of the pixels in the corresponding row;
a signal generator configured to output a time-varying, multi-bit counter signal;
a group of random access memory (RAM) multi-bit storage elements displaced from the array on the IC, wherein each of the RAM storage elements
is configurable to receive the counter signal, and
is configurable to store a value of the counter signal in response to transmission of the first signal by one of the pixels; and
a decoder connected to each column of the pixel array by a corresponding pair of first and second selection lines orthogonal to the first group of pixel output lines, each imaging cycle includes multiple readout cycles, the decoder configured to readout pixels from the array by outputting a column-specific first and second selection signals on corresponding first and second selection lines so as to cause pixels of a first of the column subgroups sharing a common pixel output line to simultaneously time-muliplex corresponding pixel output signals during a first part of each readout cycle, and to cause pixels of a second of the column subgroups sharing a common pixel output line to simultaneously time-muliplex corresponding pixel output signals during a second part of each readout cycle.

14. The image sensor of claim 13, wherein
each of the pixel output lines is in communication with at least four pixels located in different ones of the column subgroups,
each row of the array corresponds to at least four pixel output lines, and
the array is at least a 40 pixel by 40 pixel array.

15. The image sensor of claim 13, wherein the decoder is configured to only read pixels from the first column subgroup during the first part of each readout cycle and to only read pixels from the second column subgroup during the second part of each readout cycle.

16. The image sensor of claim 13 wherein, as to each of the group of pixel output lines,
the pixels in communication with the output line form a serial scan chain,
the decoder is configured to sequentially shift the outputs of all pixels in the scan chain.

17. The image sensor of claim 13, further comprising:
a computer mouse case;
a light source contained within the mouse case; and
a circuit board within the mouse case supporting the image sensor.

* * * * *